United States Patent
Wada et al.

(10) Patent No.: US 7,616,229 B2
(45) Date of Patent: Nov. 10, 2009

(54) SURVEILLANCE CAMERA APPARATUS

(75) Inventors: Jouji Wada, Yokohama (JP); Tetsurou Kajino, Tokyo-to (JP); Yoshihiro Fujiwara, Sagamihara (JP); Gil Palma Guerrero, Jr., Metro Manila (PH)

(73) Assignee: Panasonic Corporation, Osaka (JP)

( * ) Notice: Subject to any disclaimer, the term of this patent is extended or adjusted under 35 U.S.C. 154(b) by 751 days.

(21) Appl. No.: 10/615,691

(22) Filed: Jul. 8, 2003

(65) Prior Publication Data

US 2004/0032492 A1    Feb. 19, 2004

(30) Foreign Application Priority Data

Jul. 8, 2002    (JP) ............... 2002-199096

(51) Int. Cl.
   H04N 7/18     (2006.01)
   H04N 5/225    (2006.01)
(52) U.S. Cl. ...................... 348/151; 348/373
(58) Field of Classification Search ................ 348/143, 348/151, 373–375
   See application file for complete search history.

(56) References Cited

U.S. PATENT DOCUMENTS

| | | | | |
|---|---|---|---|---|
| 3,732,368 | A * | 5/1973 | Mahlab | ............... 348/151 |
| 5,241,380 | A | 8/1993 | Laveen et al. | |
| 5,627,616 | A | 5/1997 | Sergeant et al. | |
| 6,019,524 | A * | 2/2000 | Arbuckle | ............... 396/427 |
| 6,769,131 | B1 * | 7/2004 | Tanaka et al. | ............ 725/105 |
| 6,985,178 | B1 * | 1/2006 | Morita et al. | ........... 348/211.3 |
| 2004/0012715 | A1 * | 1/2004 | Gin | ............... 348/375 |

FOREIGN PATENT DOCUMENTS

| | | |
|---|---|---|
| AU | 643 418 B | 11/1993 |
| EP | 0 532 271 | 3/1993 |

* cited by examiner

Primary Examiner—Dave Czekaj
Assistant Examiner—Jeremaiah C Huber
(74) Attorney, Agent, or Firm—Pearne & Gordon LLP

(57) ABSTRACT

Herein disclosed is a surveillance camera apparatus, comprising: a housing assembly having a slanted plate portion with an inner surface; and a camera assembly accommodated in said housing assembly, said slanted plate portion forming part of said housing assembly defining an opening therein, said opening having a central axis thereof, said opening having an imaginary inner surface flush with said inner surface of said slanted plate portion forming part of said housing assembly, and said imaginary inner surface of said opening having the shape of a circle, said camera assembly, including: a stationary member; a pan shaft having a pan axis thereof, said pan shaft being supported by said stationary member to be revolvable around said pan axis; a retaining member integrally formed with said pan shaft; a tilt shaft having a tilt axis thereof, said tilt shaft being retained by said retaining member to be revolvable around said tilt axis under the state that said tilt axis of said tilt shaft is in perpendicular relationship with said pan axis of said pan shaft; an imaging unit for taking an image of a specific object through said opening of said slanted plate portion forming part of said housing assembly, said imaging unit having a light axis thereof, said imaging unit being integrally supported by said tilt shaft under the state that said light axis of said imaging unit is in perpendicular relationship with said tilt axis of said tilt shaft; a pan motor for having said pan shaft driven around said pan axis; and a controlling unit for controlling said pan motor to have said pan motor move said imaging unit around said pan axis of said pan shaft in response to the revolution of said tilt shaft to be driven around said tilt axis.

27 Claims, 17 Drawing Sheets

SURVEILLANCE CAMERA APPARATUS

BACKGROUND OF THE INVENTION

1. Field of the Invention

The present invention relates to a surveillance camera apparatus, and more particularly to a surveillance camera apparatus partially constituting a surveillance system for watching a specific object such as for example unqualified people and other intruders intruding into a special room that does not permit people without permission to enter.

2. Description of the Related Art

Up until now, there have been proposed a wide variety of conventional surveillance camera apparatus comprising a housing assembly having an opening, and a camera assembly accommodated in the housing assembly, the camera assembly taking an image of a specific object through the opening of the housing assembly.

One typical example of the conventional surveillance camera apparatus 100 of this type comprises a housing assembly 180 and a camera assembly 125 accommodated in the housing assembly 180. The housing assembly 180 is shown in FIG. 13 as including a slanted plate portion 121 defining a circular opening 185 having a central axis 135, a hollow hemispherical portion 130.

The camera assembly 125 is shown in FIG. 11 as including a stationary member 126, a pan shaft 140 having a pan axis "A" perpendicular to a horizontal plane 190, the pan shaft 140 being supported by the stationary member to be revolvable around the pan axis "A", a retaining member 109 integrally formed with the pan shaft 140, a tilt shaft 150 having a tilt axis "B" thereof, the tilt shaft 150 being retained by the retaining member 109 to be revolvable around the tilt axis "B" under the state that the tilt axis "B" of the tilt shaft 150 is in perpendicular relationship with the pan axis "A" of the pan shaft 140, an imaging unit 110 for taking an image of a specific object through the opening 185 of the slanted plate portion 121 forming part of the housing assembly 180, the imaging unit 110 having a light axis 129 thereof, the imaging unit 110 being integrally supported by the tilt shaft 150 under the state that the light axis 129 of the imaging unit 110 is in perpendicular relationship with the tilt axis "B" of the tilt shaft 150.

The camera assembly 125 further includes a pan motor 160 for having the pan shaft 140 driven around the pan axis "A", a tilt motor 170 for having the tilt shaft 150 driven around the tilt axis "B", and a controlling unit 120 for controlling the pan motor 160 to have the imaging unit 110 move around the pan axis "A" of the pan shaft 140, and controlling the tilt motor 170 to have the imaging unit 110 move around the tilt axis "B" of the tilt shaft 150.

The controlling unit 120 is shown in FIG. 12 as including pan signal producing means 161 for producing a pan signal in association with the revolution of the pan shaft 140, pan value calculating means 165 for calculating a pan value indicative of the pan angle "$\theta p$" in response to the pan signal produced by the pan signal producing means 161, tilt signal producing means 171 for producing a tilt signal in association with the revolution of the tilt shaft 150, and tilt value calculating means 175 for calculating a tilt value indicative of the tilt angle "$\theta t$" in response to the tilt signal produced by the tilt signal producing means 171.

The controlling unit 120 further includes upper-limiting pan value storing means 164 for previously storing a predetermined upper-limiting pan value "$\Theta pmax$", pan motor controlling means 163 for controlling the pan motor driving means 162 to have the pan motor driving means 162 drive the pan motor 160 in response to the predetermined upper-limiting pan value "$\Theta pmax$" received from the upper-limiting pan value storing means 164 and the pan value calculated by the pan value calculating means 165, and pan motor driving means 162 for driving the pan motor 160 to have the driving shaft of the pan motor 160 move around the central axis of the driving shaft of the pan motor 160.

The controlling unit 120 further includes upper-limiting tilt value storing means 174 for previously storing a predetermined upper-limiting tilt value "$\Theta tmax$", tilt motor controlling means 173 for controlling the tilt motor driving means 172 to have the tilt motor driving means 172 drive the tilt motor 170 in response to an operation command signal received from a microcomputer unit through an input terminal 176, the predetermined upper-limiting tilt value "$\Theta tmax$" received from the upper-limiting tilt value storing means 174 and the tilt value calculated by the tilt value calculating means 175, and tilt motor driving means 172 for driving the tilt motor 170 to have the driving shaft of the tilt motor 170 move around the central axis of the driving shaft of the tilt motor 170.

The conventional surveillance camera apparatus constructed as previously mentioned is securely supported by, for example, a ceiling wall partially forming a special room to watch the specific object such as for example unqualified people and other intruders intruding into the special room that does not permit people with any permission from entering.

In order to have the imaging unit 110 move around the pan axis "A" of the pan shaft 140, the microcomputer is operated to output the operation command signal to the controlling unit 120. The operation command signal is firstly received from the microcomputer unit through the input terminal 166 by the controlling unit 120. The pan motor driving means 162 is then controlled by the pan motor controlling means 163 to have the imaging unit 110 move around the pan axis "A" of the pan shaft 140 in response to the operation command signal received from the microcomputer unit through the input terminal 166, the pan value calculated by the pan value calculating means 165, and the predetermined upper-limiting pan value "$\Theta pmax$" received from the upper-limiting pan value storing means 164.

The pan motor driving means 162 is then controlled by the pan motor controlling means 163 to have the imaging unit 110 move around the pan axis "A" of the pan shaft 140 when the judgment is made by the pan motor controlling means 163 as the pan value calculated by the pan value calculating means 165 being smaller than the predetermined upper-limiting pan value "$\Theta pmax$" received from the upper-limiting pan value storing means 164. The pan motor driving means 162 is, on the other hand, controlled by the pan motor controlling means 163 to have the imaging unit 110 fail to move around the pan axis "A" of the pan shaft 140 when the judgment is made by the pan motor controlling means 163 as the pan value calculated by the pan value calculating means 165 being not smaller than the predetermined upper-limiting pan value "$\Theta pmax$" received from the upper-limiting pan value storing means 164.

Referring to FIG. 14 of the drawings, there is shown a graph showing the predetermined upper-limiting pan value "$\Theta pmax$" in association with the tilt angle "$\theta t$", the broken line 200 indicative of each of the upper-limiting pan value "$\Theta p$" and the upper-limiting tilt value "$\Theta t$", a first straight line passing through the point "R1" and the point "R2", a second straight line passing through the point "R1" and the point "R8", a third straight line passing through the point "R2" and the point "R9", a region defined by the broken line 200 and the first to third straight lines. The upper-limiting pan value "$\Theta p$" and the upper-limiting tilt value "$\Theta t$" each depends on the shape of the opening 185 of the slanted plate portion 121 and the slanted angle "θo" at which the inner surface of the slanted plate portion 121 is in face-to-face relation ship with the inner surface of the vertical plate portion.

If the imaging unit 110 is moved into the region defined by the broken line 200 and the first to third straight lines as previously mentioned, the slanted plate portion 121 of the housing assembly 180 functions to prevent the imaging unit 110 from taking the image of the object.

The conventional surveillance camera apparatus thus constructed as previously mentioned, however, encounter such a problem that each of the pan motor and tilt motor is controlled by the controlling unit to have imaging unit move around each of the pan axis of the pan shaft and tilt axis of the tilt shaft without taking account of the slanted angle and the shape of the opening of the slanted plate portion of the housing assembly. This leads to the fact that the slanted plate portion of the housing assembly tends to function to prevent the imaging unit from taking the image of the object. As a result of the fact that the slanted plate portion of the housing assembly tends to prevent the imaging unit from taking the image of the object, the slanted plate portion of the housing assembly makes it impossible for the surveillance system to watch a specific object such as for example unqualified people and other intruders intruding into a special room that does not permit people with any permission from entering.

SUMMARY OF THE INVENTION

It is, therefore, an object of the present invention to provide a surveillance camera apparatus which can control each of the pan motor and tilt motor to have imaging unit move around each of the pan axis of the pan shaft and tilt axis of the tilt shaft with taking account of the slanted angle and the shape of the opening of the slanted plate portion of the housing assembly.

It is an another object of the present invention to provide a surveillance camera apparatus which can be inexpensive in production cost.

It is a further object of the present invention to provide a surveillance camera apparatus which can be simple in construction and downsized.

According to the first aspect of the present invention, there is provided a surveillance camera apparatus, comprising: a housing assembly having a slanted plate portion with an inner surface; and a camera assembly accommodated in the housing assembly, the slanted plate portion forming part of the housing assembly defining an opening therein, the opening having a central axis thereof, the opening having an imaginary inner surface flush with the inner surface of the slanted plate portion forming part of the housing assembly, and the imaginary inner surface of the opening having the shape of a circle, the camera assembly, including: a stationary member; a pan shaft having a pan axis thereof, the pan shaft being supported by the stationary member to be revolvable around the pan axis; a retaining member integrally formed with the pan shaft; a tilt shaft having a tilt axis thereof, the tilt shaft being retained by the retaining member to be revolvable around the tilt axis under the state that the tilt axis of the tilt shaft is in perpendicular relationship with the pan axis of the pan shaft; an imaging unit for taking an image of a specific object through the opening of the slanted plate portion forming part of the housing assembly, the imaging unit having a light axis thereof, the imaging unit being integrally supported by the tilt shaft under the state that the light axis of the imaging unit is in perpendicular relationship with the tilt axis of the tilt shaft; a pan motor for having the pan shaft driven around the pan axis; and a controlling unit for controlling the pan motor to have the pan motor move the imaging unit around the pan axis of the pan shaft in response to the revolution of the tilt shaft to be driven around the tilt axis.

The surveillance camera apparatus may further comprises a tilt motor for having the tilt shaft driven around the tilt axis. The controlling unit may be operative to control the tilt motor to have the tilt motor move the imaging unit around the tilt axis of the tilt shaft in response to the revolution of the pan shaft to be driven around the pan axis.

The light axis of the imaging unit may be in coplanar relationship with the pan axis of the pan shaft on a first imaginary tilt plane. The light axis of the imaging unit may be in coplanar relationship with the tilt axis of the tilt shaft on a first imaginary pan plane. The first imaginary tilt plane may intersect a second imaginary tilt plane having the central axis of the opening placed thereon at a pan angle between the first imaginary tilt plane and the second imaginary tilt plane. The first imaginary pan plane may intersect a second imaginary pan plane having the central axis of the opening placed thereon at a tilt angle between the first imaginary pan plane and the second imaginary pan plane.

The controlling unit may include: pan signal producing means for producing a pan signal in association with the revolution of the pan shaft; pan value calculating means for calculating a pan value indicative of the pan angle between the first imaginary tilt plane and the second imaginary tilt plane in response to the pan signal produced by the pan signal producing means; tilt signal producing means for producing a tilt signal in association with the revolution of the tilt shaft; tilt value calculating means for calculating a tilt value indicative of the tilt angle between the first imaginary pan plane and the second imaginary pan plane in response to the tilt signal produced by the tilt signal producing means; upper-limiting pan value storing means for previously storing an upper-limiting pan value in association with the tilt angle between the first imaginary pan plane and the second imaginary pan plane, and outputting the upper-limiting pan value in response to the tilt value calculated by the tilt value calculating means; pan value judging means for judging whether or not the upper-limiting pan value received from the upper-limiting pan value storing means exceeds the pan value calculated by the pan value calculating means based on the tilt value calculated by the tilt value calculating means; pan motor driving means for driving the pan motor to have the driving shaft of the pan motor move around the central axis of the driving shaft of the pan motor; pan motor controlling means for controlling the pan motor driving means to have the pan motor driving means driven the pan motor based on results judged by the pan value judging means; upper-limiting tilt value storing means for previously storing an upper-limiting tilt value in association with the pan angle between the first imaginary tilt plane and the second imaginary tilt plane, and outputting the upper-limiting tilt value in response to the pan value calculated by the pan value calculating means; tilt value judging means for judging whether or not the upper-limiting tilt value received from the upper-limiting pan value storing means exceeds the tilt value calculated by the tilt value calculating means based on the pan value calculated by the pan value calculating means; tilt motor driving means for driving the tilt motor to have the driving shaft of the tilt motor move around the central axis of the driving shaft of the tilt motor; and tilt motor controlling means for controlling the tilt motor driving means to have the tilt motor driving means driven the tilt motor based on results judged by the tilt value judging means.

The retaining member may be in the form of L-shape in cross-section, and has a first plate portion having a surface paralleled to that of the stationary member and a second plate portion having a surface to be perpendicular to that of the first plate portion with integrally formed with the first plate portion.

The housing assembly may further include two different portions consisting of vertical and horizontal plate portions each having an inner surface, the vertical plate portion being integrally formed with the slanted plate portion under the state that the inner surface of the vertical plate portion being in face-to-face relationship with the inner surface of the slanted plate portion at a first slanted angle between the inner surface of the vertical plate portion and the inner surface of the slanted plate portion, the horizontal plate portion being integrally formed with the slanted plate portion under the state that the inner surface of the horizontal plate portion being in face-to-face relationship with the inner surface of the slanted plate portion at a second slanted angle between the inner surface of the vertical plate portion and the inner surface of the slanted plate portion, and the vertical plate portion being integrally formed with the horizontal plate portion under the state that the inner surface of the vertical plate portion being in face-to-face relationship with the inner surface of the horizontal plate portion at a right angle between the inner surface of the vertical plate portion and the inner surface of the horizontal plate portion.

The housing assembly may further include a hollow hemispherical portion having a central axis, the hollow hemispherical portion being integrally formed with the slanted plate portion under the state that the central axis of the hollow hemispherical portion and the central axis of the opening of the slanted plate portion are axially aligned with each other.

The stationary member forming part of the camera assembly may be securely formed with the horizontal plate portion forming part of the housing assembly under the state that the pan axis of the pan shaft is in coplanar relationship with the central axis of the opening of the slanted plate portion.

The stationary member forming part of the camera assembly may be securely formed with the horizontal plate portion forming part of the housing assembly under the state that the pan axis of the pan shaft and the central axis of the opening of the slanted plate portion forming part of the housing assembly intersect with each other at the central point of the imaginary inner surface of the opening of the slanted plate portion forming part of the housing assembly.

The pan motor driving means may be operative to assume three different operation states consisting of a first operation state to drive the pan motor to have the imaging unit move clockwise around the pan axis of the pan shaft, a second operation state to drive the pan motor to have the imaging unit move counterclockwise around the pan axis of the pan shaft, and a third operation state to drive the pan motor to have the imaging unit fail to move around the pan axis of the pan shaft.

The tilt motor driving means may be operative to assume three different operation states consisting of a first operation state to drive the tilt motor to have the imaging unit move clockwise around the tilt axis of the tilt shaft, a second operation state to drive the tilt motor to have the imaging unit move counterclockwise around the tilt axis of the tilt shaft, and a third operation state to drive the tilt motor to have the imaging unit fail to move around the tilt axis of the tilt shaft.

The pan motor controlling means may be operative to control the pan motor driving means to have the pan motor driving means assume the third operation state when the judgment is made by the pan value judging means as the pan value calculated by the pan value calculating means being equal to the upper-limiting pan value stored by the upper-limiting pan value storing means.

The tilt motor controlling means may be operative to control the tilt motor driving means to have the tilt motor driving means assume the third operation state when the judgment is made by the tilt value judging means as the tilt value calculated by the tilt value calculating means being equal to the upper-limiting tilt value stored by the upper-limiting tilt value storing means.

The controlling unit may be operably connected to a microcomputer for producing an operation command signal to have the imaging unit automatically move around the pan axis of the pan shaft. The pan motor controlling means may be operative to control the pan motor driving means to switch the operation state to be assumed by the pan motor driving means from one of the first operation state and the second operation state to the other of the first operation state and the second operation state when the judgment is made by the pan value judging means as the pan value calculated by the pan value calculating means being equal to the upper-limiting pan value stored by the upper-limiting pan value storing means.

The controlling unit may be operably connected to a microcomputer for producing an operation command signal to have the imaging unit automatically move around the tilt axis of the tilt shaft. The tilt motor controlling means may be operative to control the tilt motor driving means to switch the operation state to be assumed by the tilt motor driving means from one of the first operation state and the second operation state to the other of the first operation state and the second operation state when the judgment is made by the tilt value judging means as the tilt value calculated by the tilt value calculating means being equal to the upper-limiting tilt value stored by the upper-limiting tilt value storing means.

The upper-limiting pan value storing means may be operative to previously further store a mechanically-limited pan value in association with the tilt angle between the first imaginary pan plane and the second imaginary pan plane, the mechanically-limited pan value being larger than the upper-limiting pan value. The pan motor controlling means may be operative to control the pan motor driving means to have the pan motor driving means drive the pan motor, and to have the imaging unit move to the mechanically-limited pan value received from the upper-limiting pan value storing means after having the pan motor driving means assume the third operation state.

The upper-limiting tilt value storing means may be operative to previously further store a mechanically-limited tilt value in association with the pan angle between the first imaginary tilt plane and the second imaginary tilt plane, the mechanically-limited tilt value being larger than the upper-limiting tilt angle. The tilt motor controlling means may be operative to control the tilt motor driving means to have the tilt motor driving means drive the tilt motor, and to have the imaging unit move to the mechanically-limited tilt value received from the upper-limiting tilt value storing means after having tilt motor driving means assume the third operation state.

The upper-limiting pan value storing means may be operative to previously store the upper-limiting pan value "Θp" given by a following equation:

$$\Theta p = \pm \arccosine(\tan \theta t / \tan \theta o)$$

wherein "θt" is indicative of the tilt angle between the first imaginary pan plane and the second imaginary pan plane, and "θo" is indicative of the first slanted angle between the inner surface of the vertical plate portion and the inner surface of the slanted plate portion. The upper-limiting pan value storing means may be operative to output the upper-limiting pan value "Θp" to the pan value judging means in response to the tilt value calculated by the tilt value calculating means.

The upper-limiting pan value storing means may be operative to previously store the upper-limiting pan value "Θp" obtained by approximately calculating along a following equation:

$$\Theta p = \pm \arccosine(\tan \theta t / \tan \theta o)$$

wherein "θt" is indicative of the tilt angle between the first imaginary pan plane and the second imaginary pan plane, and "θo" is indicative of the first slanted angle between the inner surface of the vertical plate portion and the inner surface of the slanted plate portion. The upper-limiting pan value storing means may be operative to output the upper-limiting pan value "Θp" to the pan value judging means in response to the tilt value calculated by the tilt value calculating means.

The upper-limiting tilt value storing means may be operative to previously store the upper-limiting tilt value "Θt" given by a following equation:

$$\Theta t = \arctan(\cos \theta p \times \tan \theta o)$$

wherein "θp" is indicative of the pan angle between the first imaginary tilt plane and the second imaginary tilt plane, and "θo" is indicative of the first slanted angle between the inner surface of the vertical plate portion and the inner surface of the slanted plate portion. The upper-limiting tilt value storing means may be operative to output the upper-limiting tilt value "Θt" to the tilt value judging means in response to the pan value calculated by the pan value calculating means.

The upper-limiting tilt value storing means may be operative to previously store the upper-limiting tilt value "Θt" obtained by approximately calculating along a following equation:

$$\Theta t = \arctan(\cos \theta p \times \tan \theta o)$$

wherein "θp" is indicative of the pan angle between the first imaginary tilt plane and the second imaginary tilt plane, and "θo" is indicative of the first slanted angle between the inner surface of the vertical plate portion and the inner surface of the slanted plate portion. The upper-limiting tilt value storing means may be operative to output the upper-limiting tilt value "Θt" to the tilt value judging means in response to the pan value calculated by the pan value calculating means.

The controlling unit may include: pan signal producing means for producing a pan signal in association with the revolution of the pan shaft; pan value calculating means for calculating a pan value indicative of the pan angle between the first imaginary tilt plane and the second imaginary tilt plane in response to the pan signal produced by the pan signal producing means; tilt signal producing means for producing a tilt signal in association with the revolution of the tilt shaft; tilt value calculating means for calculating a tilt value indicative of the tilt angle between the first imaginary pan plane and the second imaginary pan plane in response to the tilt signal produced by the tilt signal producing means; upper-limiting pan value calculating means for calculating an upper-limiting pan value in association with the tilt angle between the first imaginary pan plane and the second imaginary pan plane; pan value judging means for judging whether or not the upper-limiting pan value calculated by the upper-limiting pan value calculating means exceeds the pan value calculated by the pan value calculating means based on the tilt value calculated by the tilt value calculating means; pan motor driving means for driving the pan motor to have the driving shaft of the pan motor move around the central axis of the driving shaft of the pan motor; pan motor controlling means for controlling the pan motor driving means to have the pan motor driving means driven the pan motor based on results judged by the pan value judging means; upper-limiting tilt value calculating means for calculating an upper-limiting tilt value in association with the pan angle between the first imaginary tilt plane and the second imaginary tilt plane; tilt value judging means for judging whether or not the upper-limiting tilt value received from the upper-limiting pan value calculating means exceeds the tilt value calculated by the tilt value calculating means based on the pan value calculated by the pan value calculating means; tilt motor driving means for driving the tilt motor to have the driving shaft of the tilt motor move around the central axis of the driving shaft of the tilt motor; and tilt motor controlling means for controlling the tilt motor driving means to have the tilt motor driving means driven the tilt motor based on results judged by the tilt value judging means.

BRIEF DESCRIPTION OF THE DRAWINGS

The features and advantages of a surveillance camera apparatus according to the present invention will be more clearly understood from the following description taken in conjunction with the accompanying drawings in which:

FIG. 13 (b) is a side view of the housing assembly forming part of the conventional surveillance camera apparatus.

DESCRIPTION OF THE EMBODIMENTS

Referring now to FIGS. 1 to 10 of the drawings, there is shown the preferred embodiment of the surveillance camera apparatus according to the present invention.

Figure 1:
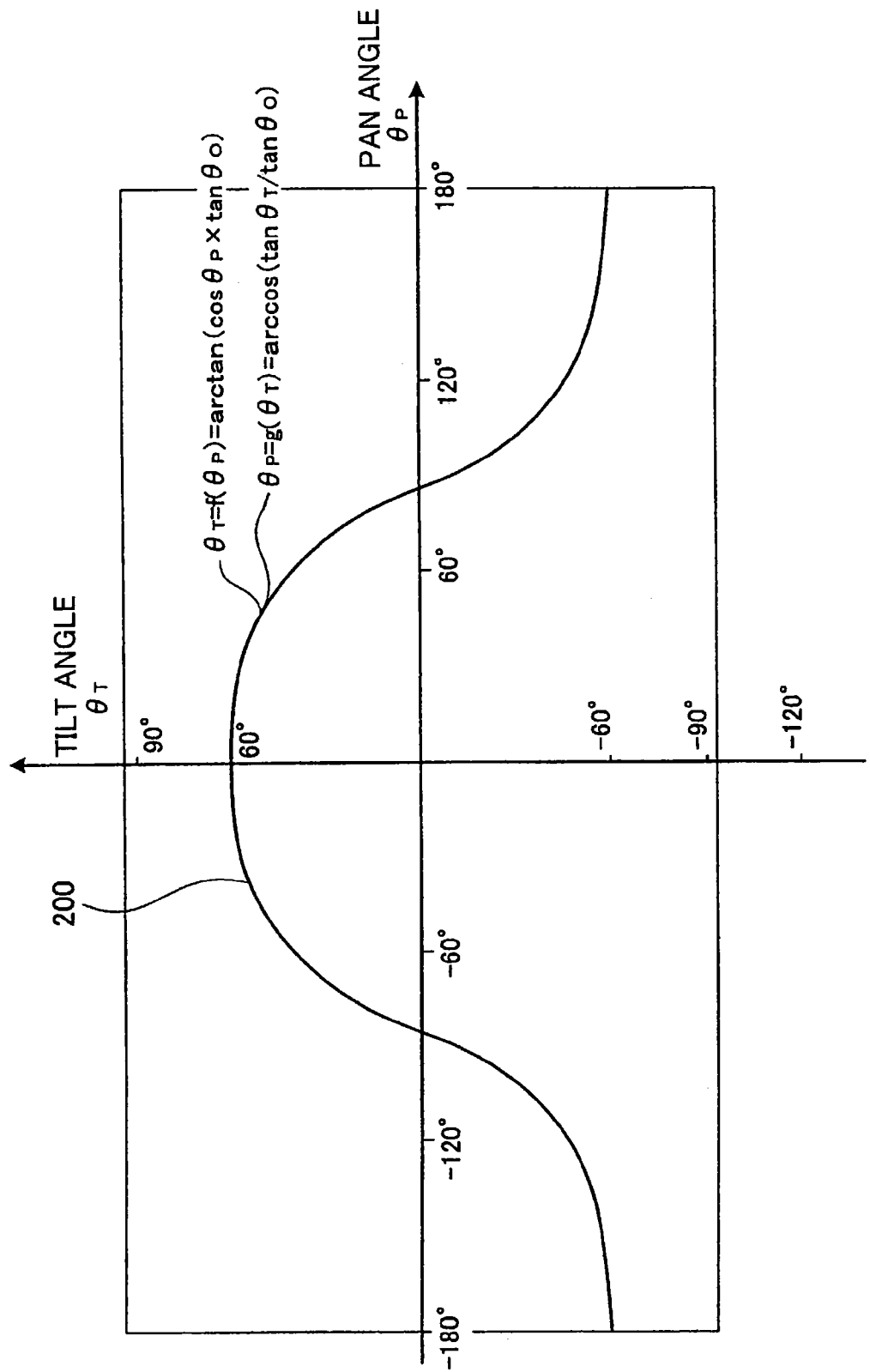
FIG. 1 is a graph showing the upper-limiting pan value stored by the upper-limiting pan value storing means and the upper-limiting tilt value stored by the upper-limiting tilt value storing means each forming part of the preferred embodiment of the surveillance camera apparatus according to the present invention.
Figure 2:
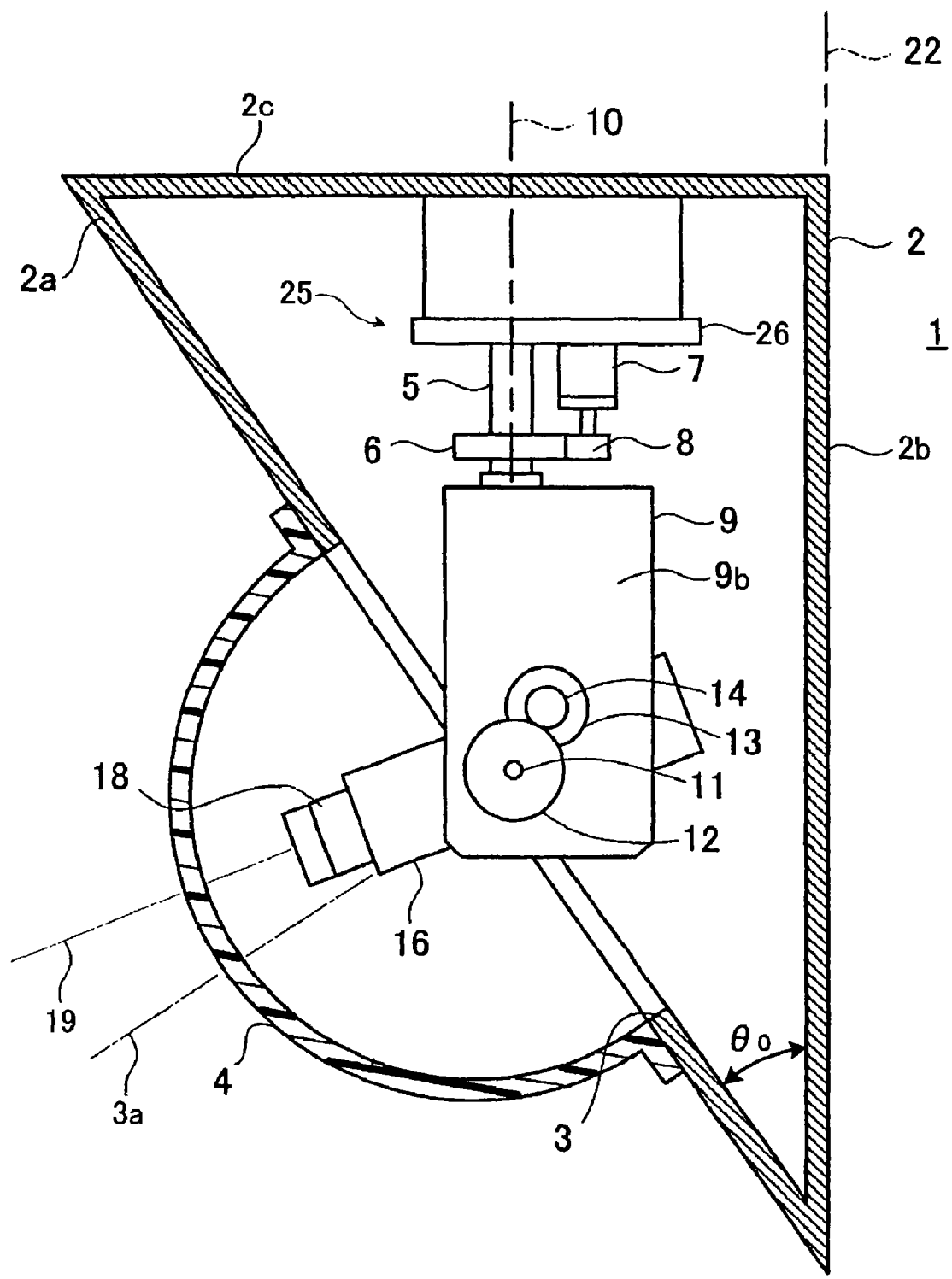
FIG. 2 is a partially cross sectional view of the preferred embodiment of the surveillance camera apparatus according to the present invention.
Figure 3:
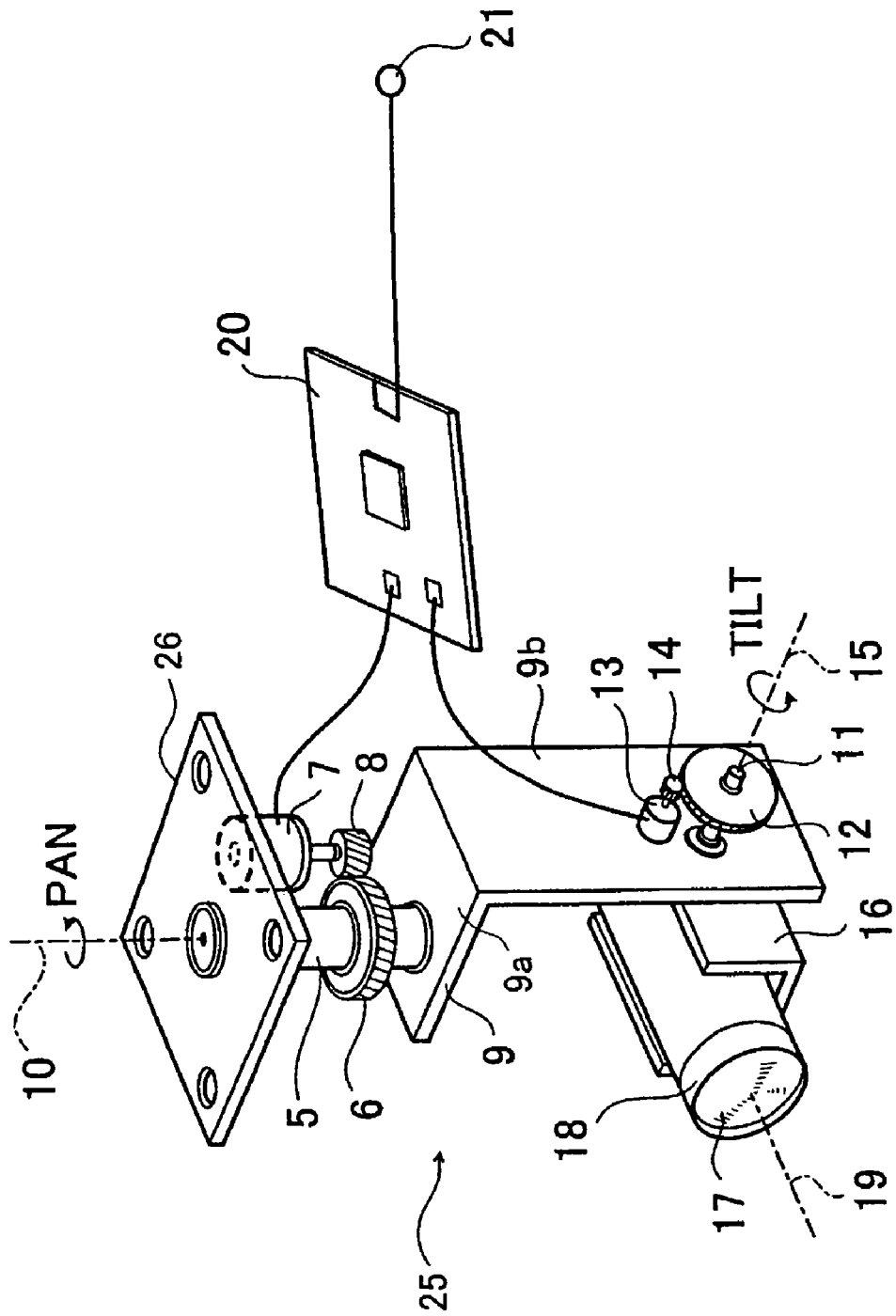
FIG. 3 is a perspective view of the preferred embodiment of the surveillance camera apparatus according to the present invention.

The preferred embodiment of the surveillance camera apparatus 1 to be securely supported by, for example, a side wall 22 partially forming a special room is shown in FIG. 2 as comprising a housing assembly 2 having a slanted plate portion 2a with an inner surface, and a camera assembly 25 accommodated in the housing assembly 2. The slanted plate portion 2a forming part of the housing assembly 2 defines an opening 3 therein, while the opening 3 has a central axis 3a thereof, the opening 3 having an imaginary inner surface flush with the inner surface of the slanted plate portion 2a forming part of the housing assembly 2, and the imaginary inner surface having the shape of a circle.

The camera assembly 25 includes a stationary member 26, a pan shaft 5 having a pan axis 10 thereof, a retaining member 9 integrally formed with the pan shaft 5, and a tilt shaft 11 having a tilt axis 15 thereof, and a retaining member 16 pivotally retained by the retaining member 9 through the tilt shaft 11. The stationary member 26 is operative to support the pan shaft 5 to be revolvable around the pan axis 10, while the retaining member 9 is operative to retain the tilt shaft 11 to be revolvable around the tilt axis 15. In this embodiment, the tilt axis 15 of the tilt shaft 11 is in perpendicular relationship with the pan axis 10 of the pan shaft 5.

The camera assembly 25 further includes an imaging unit 18 for taking an image of a specific object through the opening 3 of the slanted plate portion 2a forming part of the housing assembly 2, a pan motor 7 for having the pan shaft 5 driven around the pan axis 10 through gears 6 and 8, and a controlling unit 20 for controlling the pan motor 7 to have the pan motor 7 move the imaging unit 18 around the pan axis 10 of the pan shaft 5 in response to the revolution of the tilt shaft 11 to be driven around the tilt axis 15. The imaging unit 18 has lens 17 and a light axis 19 thereof. The imaging unit 18 is integrally supported by the tilt shaft 11 under the state that the light axis 19 of the imaging unit 18 is in perpendicular relationship with the tilt axis 15 of the tilt shaft 11.

The retaining member 9 is in the form of L-shape in cross-section and has a first plate portion 9a having a surface paralleled to that of the stationary member 26 and a second plate portion 9b having a surface to be perpendicular to that of the first plate portion 9a integrally formed with the first plate portion 9a.

The camera assembly 25 further includes a tilt motor 13 for having the tilt shaft 11 driven around the tilt axis 15 through gears 12 and 14. The controlling unit 20 is operative to control the tilt motor 13 to have the tilt motor 13 move the imaging unit 18 around the tilt axis 15 of the tilt shaft 11 in response to the revolution of the pan shaft 5 to be driven around the pan axis 10.

Figure 4A:
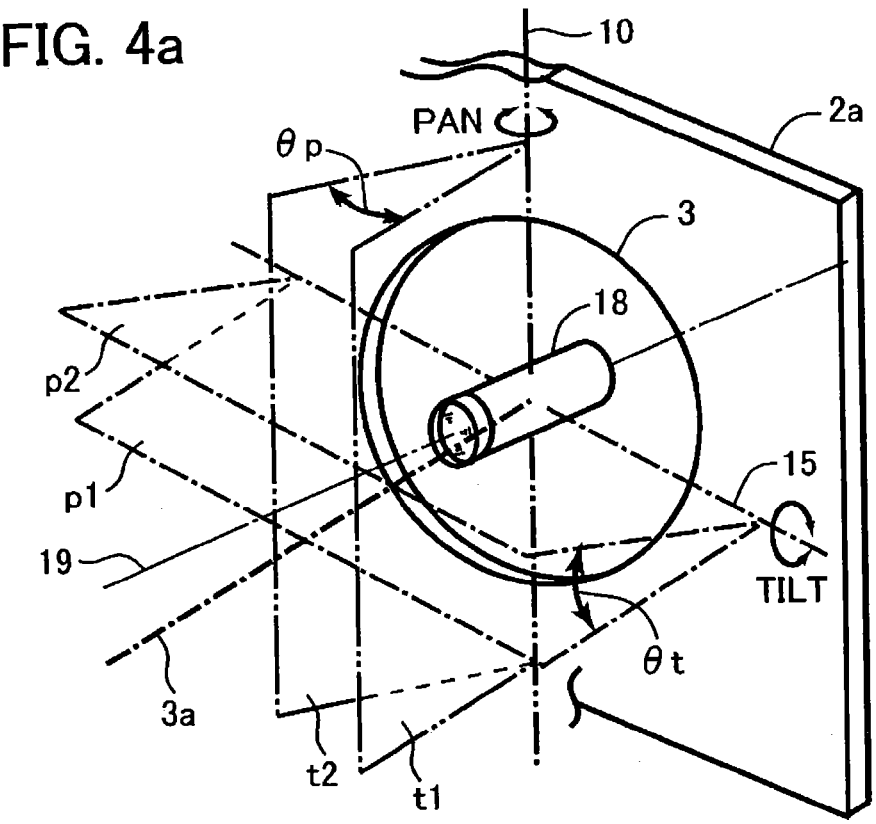
FIG. 4a is a fragmentary perspective view of the preferred embodiment of the surveillance camera apparatus according to the present invention.
Figure 4B:
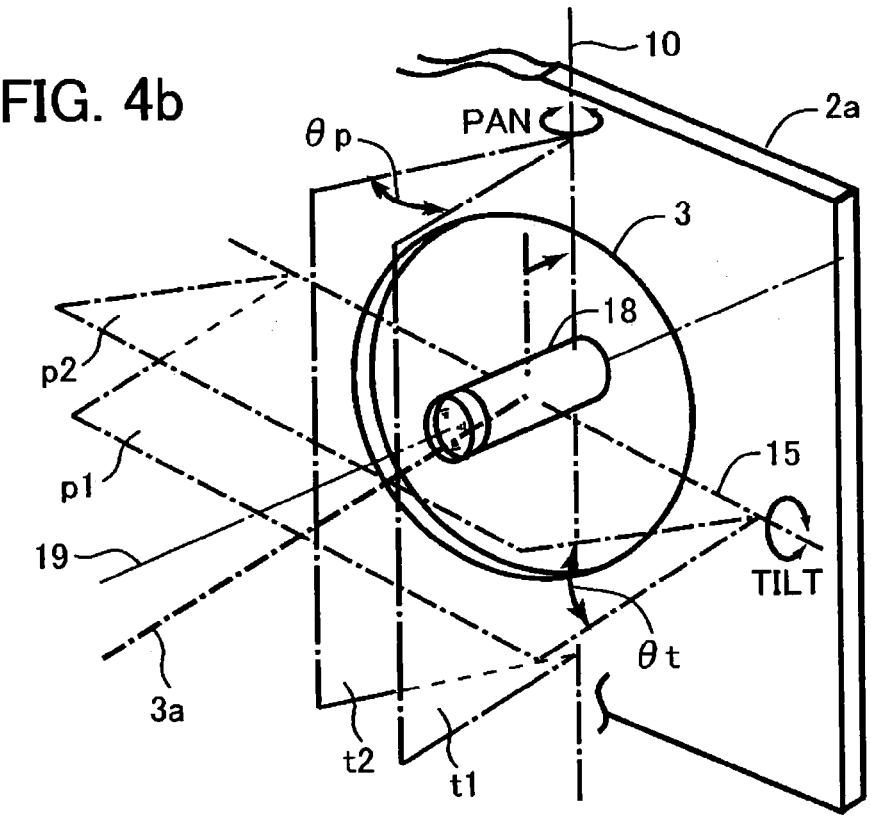
FIG. 4b is a fragmentary perspective view of the preferred embodiment of the surveillance camera apparatus according to the present invention.

The light axis 19 of the imaging unit 18 is, as shown in FIG. 4a, in coplanar relationship with the pan axis 10 of the pan shaft 5 on a first imaginary tilt plane "t1", viz., the first imaginary tilt plane "t1" having the light axis 19 of the imaging unit 18 and the pan axis 10 of the pan shaft 5 placed thereon. The first imaginary tilt plane "t1" intersects a second imaginary tilt plane "t2" having the central axis of the opening 3 placed thereon at a pan angle between the first imaginary tilt plane "t1" and the second imaginary tilt plane "t2". In the similar fashion, the light axis 19 of the imaging unit 18 is in coplanar relationship with the tilt axis 15 of the tilt shaft 11 on a first imaginary pan plane "p1", viz., the first imaginary pan plane "p1" having the light axis 19 of the imaging unit 18 and the tilt axis 15 of the tilt shaft 11 placed thereon. The first imaginary pan plane "p1" intersects a second imaginary pan plane "p2" having the central axis of the opening 3 placed thereon at a tilt angle between the first imaginary pan plane "p1" and the second imaginary pan plane "p2".

The housing assembly 2 further has vertical and horizontal plate portions 2b and 2c each having an inner surface. The vertical plate portion 2b is integrally formed with the slanted plate portion 2a under the state that the inner surface of the vertical plate portion 2b being in face-to-face relationship with the inner surface of the slanted plate portion 2a at a first slanted angle between the inner surface of the vertical plate portion 2b and the inner surface of the slanted plate portion 2a. The horizontal plate portion 2c is integrally formed with the slanted plate portion 2a under the state that the inner surface of the horizontal plate portion 2c is in face-to-face relationship with the inner surface of the slanted plate portion 2a at a second slanted angle between the inner surface of the vertical plate portion 2b and the inner surface of the slanted plate portion 2a. The vertical plate portion 2b is integrally formed with the horizontal plate portion 2c under the state that the inner surface of the vertical plate portion 2b is in perpendicular with the inner surface of the horizontal plate portion 2c.

The housing assembly 2 further includes a hollow hemispherical portion 4 having a central axis. The hollow hemispherical portion 4 is integrally formed with the slanted plate portion 2a under the state that the central axis of the hollow hemispherical portion 4 and the central axis of the opening 3 of the slanted plate portion 2a are axially aligned with each other. The hollow hemispherical portion 4 includes a hemispherical section having an annular end and an annular flange section extending outwardly of and integrally formed with the annular end of the hemispherical section and securely adhered to the slanted plate portion 2a forming part of the housing assembly 2 by an appropriate adhesive material. The hollow hemispherical portion 4 is made of a transparent synthetic resin.

The stationary member 26 is securely formed with the horizontal plate portion 2c forming part of the housing assembly 2 under the state that the pan axis 10 of the pan shaft 5 is in coplanar relationship with the central axis of the opening 3 of the slanted plate portion 2a. The stationary member 26 forming part of the camera assembly 25 is securely formed with the horizontal plate portion 2c forming part of the housing assembly 2 under the state that the pan axis 10 of the pan shaft 5 and the central axis of the opening 3 of the slanted plate portion 2a forming part of the housing assembly 2 intersect with each other at the central point of the imaginary inner surface of the opening 3 of the slanted plate portion 2a forming part of the housing assembly 2.

Figure 5:
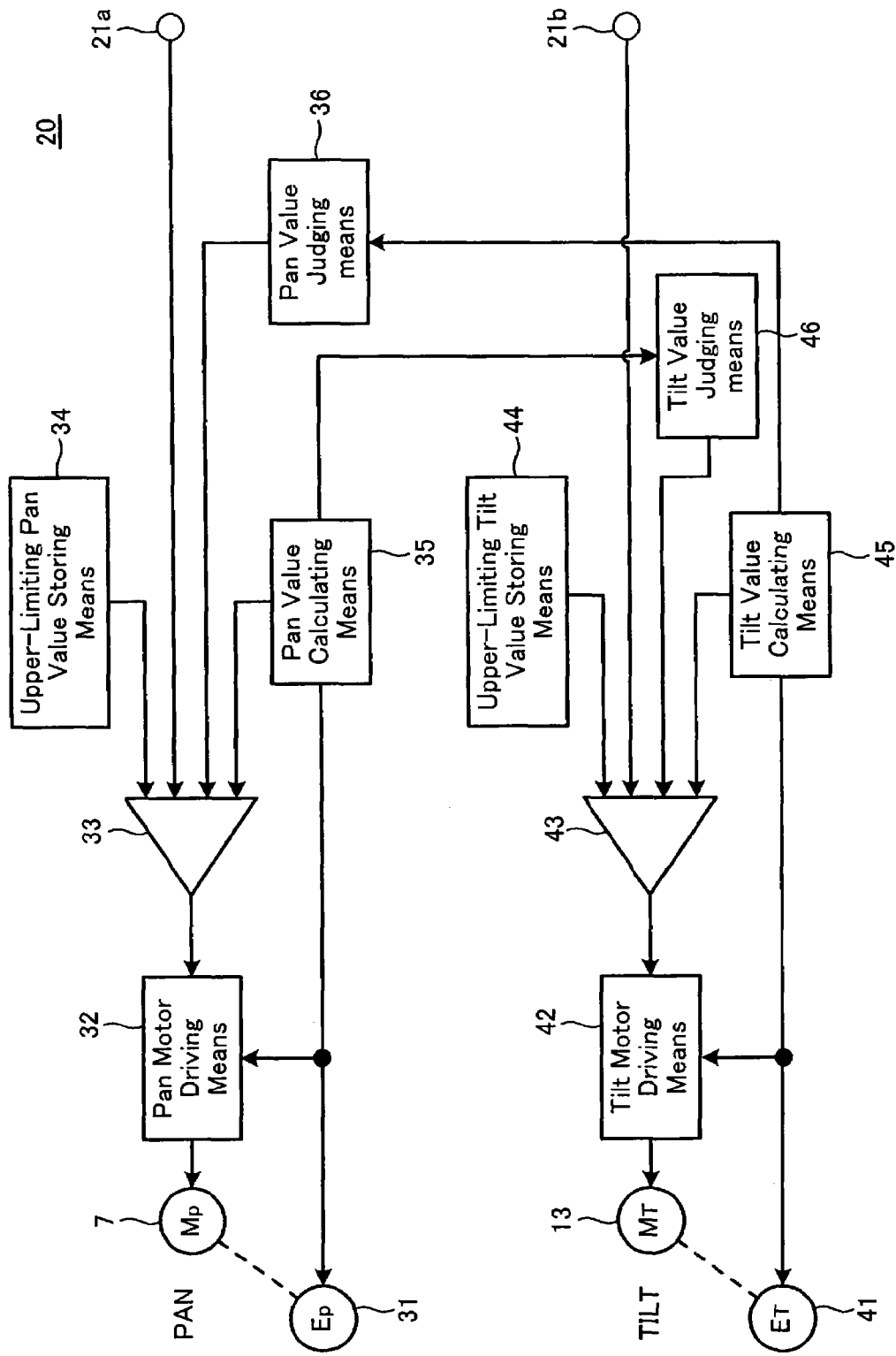
FIG. 5 is a block diagram of the controlling unit forming part of the preferred embodiment of the surveillance camera apparatus according to the present invention.
Figure 6:
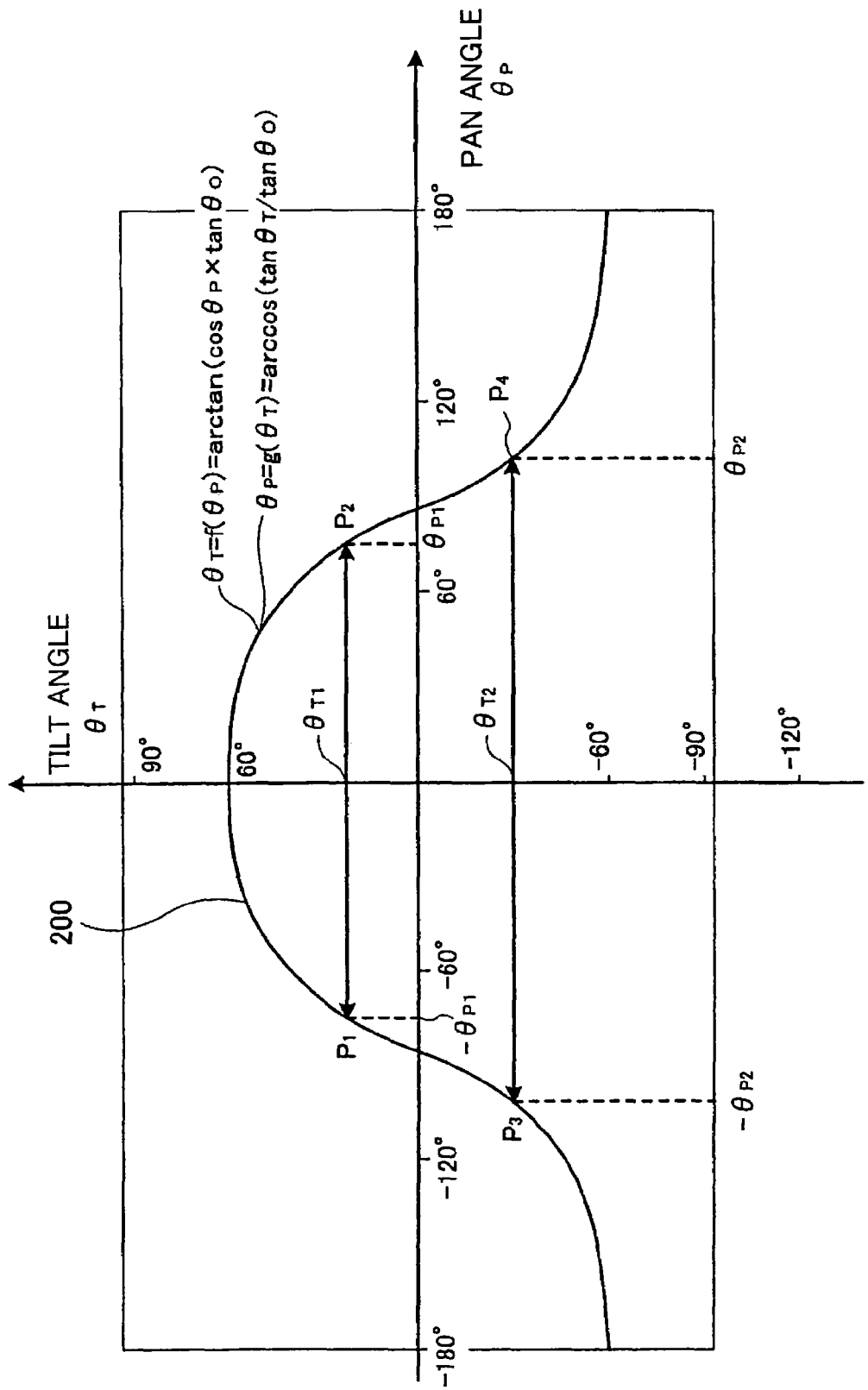
FIG. 6 is a graph showing the upper-limiting pan value stored by the upper-limiting pan value storing means and the upper-limiting tilt value stored by the upper-limiting tilt value storing means each forming part of the preferred embodiment of the surveillance camera apparatus according to the present invention.

The constitution of the controlling unit 20 forming part of the surveillance camera apparatus according to the present invention will then be described in detail hereinafter with reference to FIG. 5.

The controlling unit 20 includes pan signal producing means 31 for producing a pan signal in association with the revolution of the pan shaft 5, pan value calculating means 35 for calculating a pan value indicative of the pan angle between the first imaginary tilt plane "t1" and the second imaginary tilt plane "t2" in response to the pan signal produced by the pan signal producing means 31, tilt signal producing means 41 for producing a tilt signal in association with the revolution of the tilt shaft 11, tilt value calculating means 45 for calculating a tilt value indicative of the tilt angle between the first imaginary pan plane "p1" and the second imaginary pan plane "p2" in response to the tilt signal produced by the tilt signal producing means 41, and upper-limiting pan value storing means 34 for previously storing an upper-limiting pan value in association with the tilt angle between the first imaginary pan plane "p1" and the second imaginary pan plane "p2", and outputting the upper-limiting pan value in response to the tilt value calculated by the tilt value calculating means 45. The pan signal producing means 31 and the tilt signal producing means 41 are respectively constituted by encoders.

The controlling unit 20 further includes pan value judging means 36 for judging whether or not the upper-limiting pan value received from the upper-limiting pan value storing means 34 exceeds the pan value calculated by the pan value calculating means 35 based on the tilt value calculated by the tilt value calculating means 45, pan motor driving means 32 for driving the pan motor 7 to have the driving shaft of the pan motor 7 move around the central axis of the driving shaft of the pan motor 7, pan motor controlling means 33 for controlling the pan motor driving means 32 to have the pan motor driving means 32 driven the pan motor 7 based on results judged by the pan value judging means 36, and upper-limiting tilt value storing means 44 for previously storing an upper-limiting tilt value in association with the pan angle between the first imaginary tilt plane "t1" and the second imaginary tilt plane "t2" therein, and outputting the upper-limiting tilt value in response to the pan value calculated by the pan value calculating means 35.

The controlling unit 20 further includes tilt value judging means 46 for judging whether or not the upper-limiting tilt value received from the upper-limiting tilt value storing means 44 exceeds the tilt value calculated by the tilt value calculating means 45 based on the pan value calculated by the pan value calculating means 35, tilt motor driving means 42 for driving the tilt motor 13 to have the driving shaft of the tilt motor 13 move around the central axis of the driving shaft of the tilt motor 13, and tilt motor controlling means 43 for controlling the tilt motor driving means 42 to have the tilt motor driving means 42 driven the tilt motor 13 based on results judged by the tilt value judging means 46.

The pan motor driving means 32 is operative to assume three different operation states consisting of a first operation state to drive the pan motor 7 to have the imaging unit 18 moved clockwise around the pan axis 10 of the pan shaft 5, a second operation state to drive the pan motor 7 to have the imaging unit 18 moved counterclockwise around the pan axis 10 of the pan shaft 5, and a third operation state to drive the pan motor 7 to have the imaging unit 18 fail to move around the pan axis 10 of the pan shaft 5.

The tilt motor driving means 42 is operative to assume three different operation states consisting of a first operation state to drive the tilt motor 13 to have the imaging unit 18 moved clockwise around the tilt axis 15 of the tilt shaft 11, a second operation state to drive the tilt motor 13 to have the imaging unit 18 moved counterclockwise around the tilt axis 15 of the tilt shaft 11, and a third operation state to drive the tilt motor 13 to have the imaging unit 18 fail to move around the tilt axis 15 of the tilt shaft 11.

The pan motor controlling means 33 is operative to control the pan motor driving means 32 to have the pan motor driving means 32 assume one of the first and second states and the second operation state in response to an alternation command to have the imaging unit 18 alternatively assume the first and second operation states when the judgment is made by the pan value judging means 36 as the upper-limiting pan value stored by the upper-limiting pan value storing means 34 being equal to the pan value calculated by the pan value calculating means 35 with the pan motor 7 being driven by the tilt motor driving means 42 taking the other of the first and second operation states.

The tilt motor controlling means 43 is operative to control the tilt motor driving means 42 to have the tilt motor driving means 42 assume one of the first and second states and the second operation state in response to an alternation command to have the imaging unit 18 alternatively assume the first and second operation states when the judgment is made by the tilt value judging means 46 as the upper-limiting tilt value stored by the upper-limiting tilt value storing means 44 being equal to the tilt value calculated by the tilt value calculating means 45 with the tilt motor 13 being driven by the tilt motor driving means 42 taking the other of the first and second operation states.

The pan motor controlling means 33 is operative to control the pan motor driving means 32 to have the pan motor driving means 32 assume the third operation state when the judgment is made by the pan value judging means 36 as the upper-limiting pan value stored by the upper-limiting pan value storing means 34 being equal to the pan value calculated by the pan value calculating means 35. The tilt motor controlling means 43 is operative to control the tilt motor driving means 42 to have the tilt motor driving means 42 assume the third operation state when the judgment is made by the tilt value judging means 46 as the upper-limiting tilt value stored by the upper-limiting tilt value storing means 44 being equal to the tilt value calculated by the tilt value calculating means 45.

The pan motor controlling means 33 is operative to control the pan motor driving means 32 to have the pan motor driving means 32 drive the pan motor 7, and to have the imaging unit 18 moved to the mechanically-limited pan value over the upper-limiting pan angle to in response to a pan shaft over drive command to drive the pan motor 7 to have the imaging unit 18 moved from the upper-limiting pan angle to the mechanically-limited pan value which is larger than the upper-limiting pan angle when the pan motor 7 is driven by the tilt motor driving means 42 taking the third operation state.

The tilt motor controlling means 43 is operative to control the tilt motor driving means 42 to have the tilt motor driving means 42 drive the tilt motor 13, and to have the imaging unit 18 moved from the upper-limiting tilt angle to the mechanically-limited tilt value in response to a tilt shaft over drive command to drive the tilt motor 13 to have the imaging unit 18 moved from the upper-limiting tilt angle to the mechanically-limited tilt value which is larger than the upper-limiting tilt angle when the tilt motor 13 being driven by the tilt motor driving means 42 taking the third operation state.

The tilt motor controlling means 43 is operative to control the tilt motor driving means 42 to have the tilt motor driving means 42 assume the first operation state when the judgment is made by the tilt value judging means 46 as the upper-limiting tilt value stored by the upper-limiting tilt value storing means 44 being not larger than the tilt value calculated by the tilt value calculating means 45 based on the pan value calculated by the pan value calculating means 35 under the state that the tilt shaft 11 is counterclockwise driven around the tilt axis 15 by the tilt motor 13.

The pan motor controlling means 33 is operative to control the pan motor driving means 32 to have the pan motor driving means 32 assume the second operation state when the judgment is made by the pan value judging means 36 as the upper-limiting pan value stored by the upper-limiting pan value storing means 34 being not larger than the pan value calculated by the pan value calculating means 35 based on the pan value calculated by the pan value calculating means 35 under the state that the pan shaft 5 is clockwise driven around the pan axis 10 by the pan motor 7.

The pan motor controlling means 33 is operative to control the pan motor driving means 32 to have the pan motor driving means 32 assume the first operation state when the judgment is made by the pan value judging means 36 as the upper-limiting pan value stored by the upper-limiting pan value storing means 34 being not larger than the pan value calculated by the pan value calculating means 35 based on the pan value calculated by the pan value calculating means 35 under the state that the pan shaft 5 is counterclockwise driven around the pan axis 10 by the pan motor 7.

The upper-limiting pan value storing means 34 is operative to previously store the upper-limiting pan value "Θ" given by a following equation (1).

$$\Theta p = \pm \arccos(\tan \theta t / \tan \theta o) \quad (1)$$

Here, the legend "θt" is indicative of the tilt angle between the first imaginary pan plane "p1" and the second imaginary pan plane "p2", and the legend "θo" is indicative of the first slanted angle between the inner surface of the vertical plate portion 2b and the inner surface of the slanted plate portion 2a. The upper-limiting pan value storing means 34 is operative to output the upper-limiting pan value "Θp" to the pan value judging means 36 in response to the tilt value calculated by the tilt value calculating means 45.

The upper-limiting tilt value storing means 44 is operative to previously store the upper-limiting tilt value "Θt" given by a following equation (2).

$$\Theta t = \arctan(\cos \theta p \times \tan \theta o) \quad (2)$$

Here the legend "θp" is indicative of the pan angle between the first imaginary tilt plane "t1" and the second imaginary tilt plane "t2", and the legend "θo" is indicative of the first slanted angle between the inner surface of the vertical plate portion 2b and the inner surface of the slanted plate portion 2a. The upper-limiting tilt value storing means 44 is operative to output the upper-limiting tilt value "Θt" to the tilt value judging means 46 in response to the pan value calculated by the pan value calculating means 35.

The operation of the surveillance camera system 1 according to the present embodiment will be described hereinafter with reference to FIGS. 6 to 10.

The following detailed description will be directed to the first case that the controlling unit 18 is operated in compliance with an operation command signal inputted into the controlling unit 20 to have the imaging unit 18 move around the pan axis 10 of the pan shaft.

In order to have the controlling unit 20 adjust the tilt angle "θt" between the first imaginary pan plane "p1" and the second imaginary pan plane "p2" to, for example, a tilt angle "θT1", and to have the imaging unit 18 move around the pan axis 10 of the pan shaft 5, the microcomputer is operated to output the operation command signal to the controlling unit 20.

The operation command signal is firstly received from the microcomputer unit by the controlling unit 20 through a terminal 21. The tilt motor driving means 42 is then controlled by the tilt motor controlling means 43 to have the tilt motor driving means 42 drive the tilt motor 13 in response to the operation command signal received from the microcomputer unit, the tilt value calculated by the tilt value calculating means 45, and the upper-limiting tilt value received from the upper-limiting tilt value storing means 44. The tilt motor 13 is then driven by the tilt motor driving means 42 to have the imaging unit 18 move around the tilt axis 15 of the tilt shaft 11 in the step S11 The judgment is then made by the tilt value judging means 46 on whether or not the tilt angle "θt" between the first imaginary pan plane "p1" and the second imaginary pan plane "p2" is equal to the tilt angle "θT1" based on the tilt value calculated by the tilt value calculating means 45 in the step S12.

When the answer in the step S02 is in the affirmative "Yes", i.e., the tilt angle "θt" between the first imaginary pan plane "p1" and the second imaginary pan plane "p2" is equal to the tilt angle "θT1", the step S12 proceeds to the step S13. When, on the other hand, the answer in the step 02 is in the negative "No", i.e., the tilt angle "θt" between the first imaginary pan plane "p1" and the second imaginary pan plane "p2" is not equal to the tilt angle "θT1", the step S12 proceeds to the step S11.

The pan motor driving means 32 is then controlled by the pan motor controlling means 33 to have the pan motor driving means 32 drive the pan motor 7 in response to the operation command signal received from the microcomputer unit, the pan value calculated by the pan value calculating means 35, the upper-limiting pan value received from the upper-limiting pan value storing means 34, and results judged by pan value judging means 36 in the step S13. The pan motor 7 is then driven by the pan motor driving means 32 to have the imaging unit 18 move around the pan axis 10 of the pan shaft 5 in the step S14. The judgment is then made by the pan value judging means 36 on whether or not the upper-limiting pan value "Θp" received from the upper-limiting pan value storing means 34 exceeds the pan value calculated by the pan value calculating means 35 based on the tilt value calculated by the tilt value calculating means 45 in the step S15.

When the answer in the step S15 is in the affirmative "Yes", i.e., the upper-limiting pan value "Θp" received from the upper-limiting pan value storing means 34 exceeds the pan value calculated by the pan value calculating means 35, the step S15 proceeds to the step S14. When, on the other hand, the answer in the step S15 is in the negative "No", i.e., the upper-limiting pan value "Θp" received from the upper-limiting pan value storing means 34 does not exceed the pan value calculated by the pan value calculating means 35, the step S15 proceeds to the step S16. The pan motor 7 is then driven by the pan motor driving means 32 to have the imaging unit 18 fail to move around the pan axis 10 of the pan shaft 5 in the step S16.

From the above detail description, it will be understood that the pan motor can be driven by the pan motor driving means 32 to have the imaging unit 18 move around the pan axis 10 of the pan shaft 5 within the upper-limiting pan value "Θp" depending on the first slanted angle "θo" and the shape of the opening 3 of the slanted plate portion 2a.

Similarly, in order to have the controlling unit 20 adjust the tilt angle "θt" between the first imaginary pan plane "p1" and the second imaginary pan plane "p2" to a tilt angle "θT2" which is larger than an angle of 90 degrees, and to have the imaging unit 18 move around the pan axis 10 of the pan shaft 5 in response to the operation command signal to have the imaging unit 18 move around the pan axis 10 of the pan shaft 5, the microcomputer is operated to output the operation command signal to the controlling unit 20.

The operation command signal is firstly received from the microcomputer unit by the controlling unit 20. The tilt motor driving means 42 is then controlled by the tilt motor controlling means 43 to have the tilt motor driving means 42 drive the tilt motor 13 in response to the operation command signal received from the microcomputer unit, the tilt value calculated by the tilt value calculating means 45, and the upper-limiting tilt value received from the upper-limiting tilt value storing means 44. The tilt motor 13 is then driven by the tilt motor driving means 42 to have the imaging unit 18 move around the tilt axis 15 of the tilt shaft 11 in the step S21. The judgment is then made by the tilt value judging means 46 on whether or not the tilt angle "θt" between the first imaginary pan plane "p1" and the second imaginary pan plane "p2" is equal to the tilt angle "θT2" based on the tilt value calculated by the tilt value calculating means 45 in the step S22.

When the answer in the step S22 is in the affirmative "Yes", i.e., the tilt angle "θt" between the first imaginary pan plane "p1" and the second imaginary pan plane "p2" is equal to the tilt angle "θT2", the step S12 proceeds to the step S23. When, on the other hand, the answer in the step 22 is in the negative "No", i.e., the tilt angle "θt" between the first imaginary pan plane "p1" and the second imaginary pan plane "p2" is not equal to the tilt angle "θT2", the step S22 proceeds to the step S21.

The pan motor driving means 32 is then controlled by the pan motor controlling means 33 to have the pan motor driving means 32 drive the pan motor 7 in response to the operation command signal received from the microcomputer unit, the pan value calculated by the pan value calculating means 35, the upper-limiting pan value received from the upper-limiting pan value storing means 34, and results judged by pan value judging means 36 in the step S23. The pan motor 7 is then driven by the pan motor driving means 32 to have the imaging unit 18 move around the pan axis 10 of the pan shaft 5 in the step S24. The judgment is then made by the pan value judging means 36 on whether or not the upper-limiting pan value "Θp" received from the upper-limiting pan value storing means 34 exceeds the pan value calculated by the pan value calculating means 35 based on the tilt value calculated by the tilt value calculating means 45 in the step S25.

When the answer in the step S25 is in the affirmative "Yes", i.e., the upper-limiting pan value "Θp" received from the upper-limiting pan value storing means 34 exceeds the pan value calculated by the pan value calculating means 35, the step S25 proceeds to the step S24. When, on the other hand, the answer in the step S25 is in the negative "No", i.e., the upper-limiting pan value "Θp" received from the upper-limiting pan value storing means 34 does not exceed the pan value calculated by the pan value calculating means 35, the step S25 proceeds to the step S26. The pan motor 7 is then driven by the pan motor driving means 32 to have the imaging unit 18 fail to move around the pan axis 10 of the pan shaft 5 in the step S26.

From the above detail description, it will be understood that the pan motor can be driven by the pan motor driving means 32 to have the imaging unit 18 move around the pan axis 10 of the pan shaft 5 with the upper-limiting pan value "Θp" depending on the first slanted angle "θo" and the shape of the opening 3 of the slanted plate portion 2a.

Figure 7:
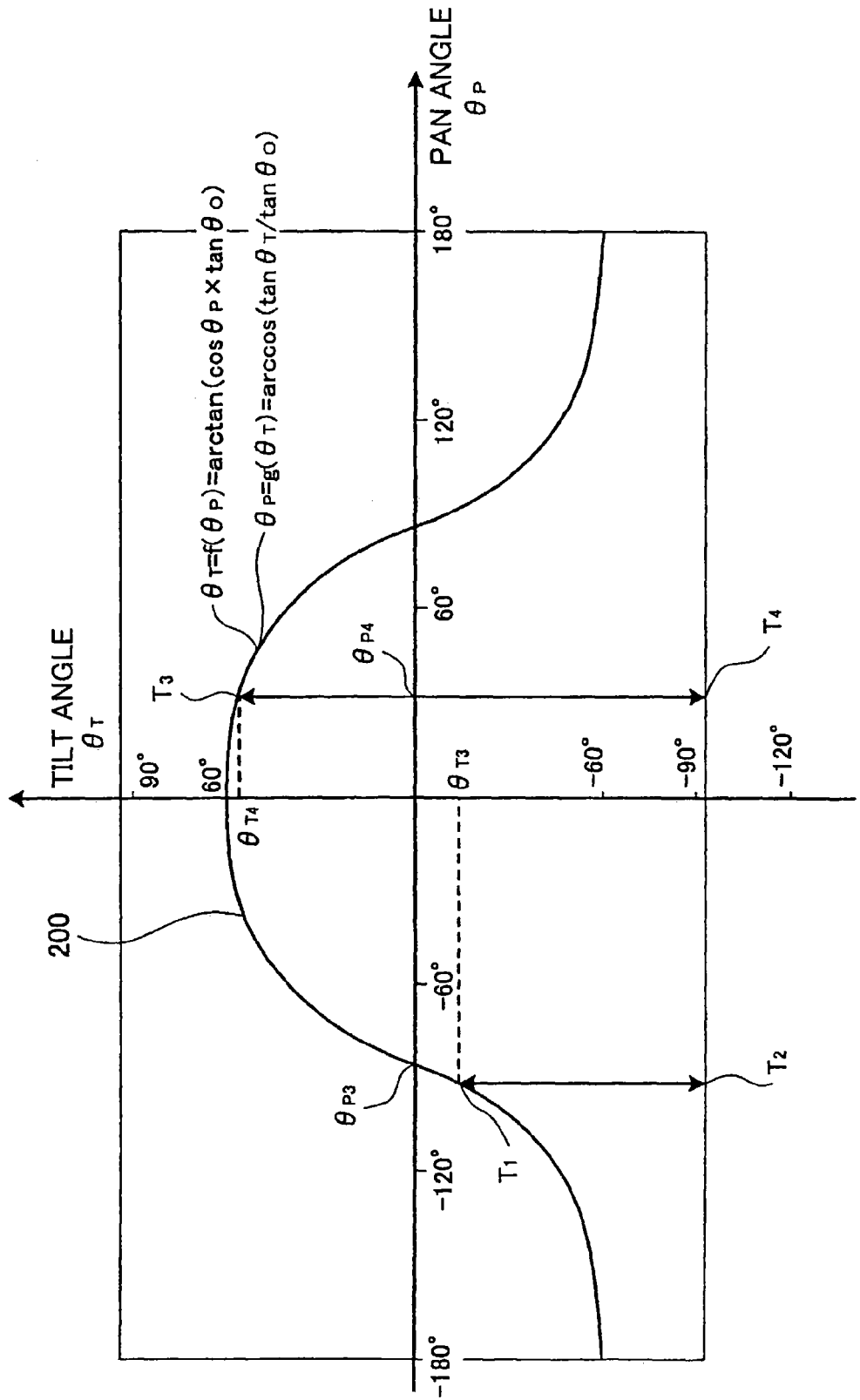
FIG. 7 is a graph showing the upper-limiting pan value stored by the upper-limiting pan value storing means and the upper-limiting tilt value stored by the upper-limiting tilt value storing means each forming part of the preferred embodiment of the surveillance camera apparatus according to the present invention.
Figure 8:
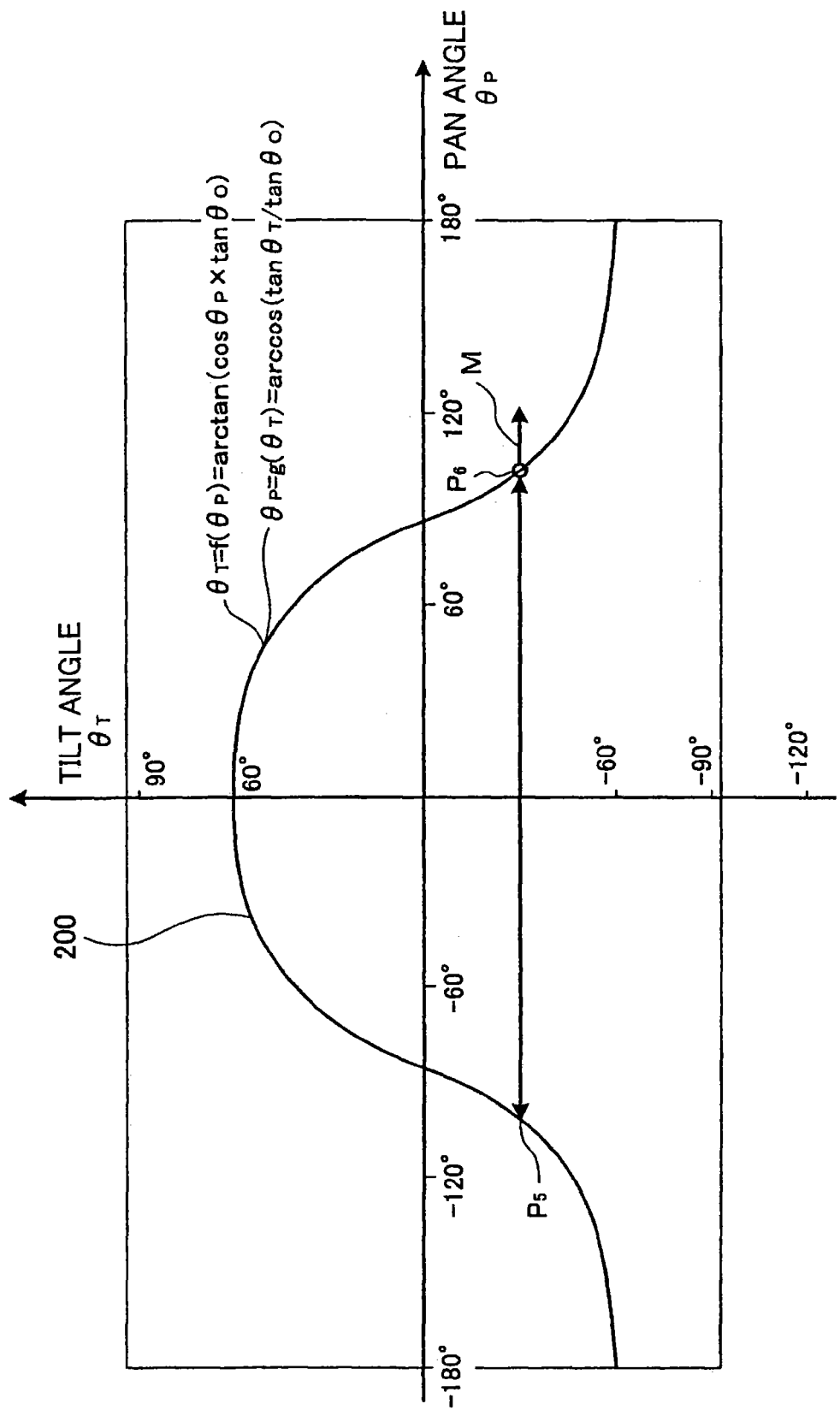
FIG. 8 is a graph showing the upper-limiting pan value stored by the upper-limiting pan value storing means and the upper-limiting tilt value stored by the upper-limiting tilt value storing means each forming part of the preferred embodiment of the surveillance camera apparatus according to the present invention.
Figure 9:
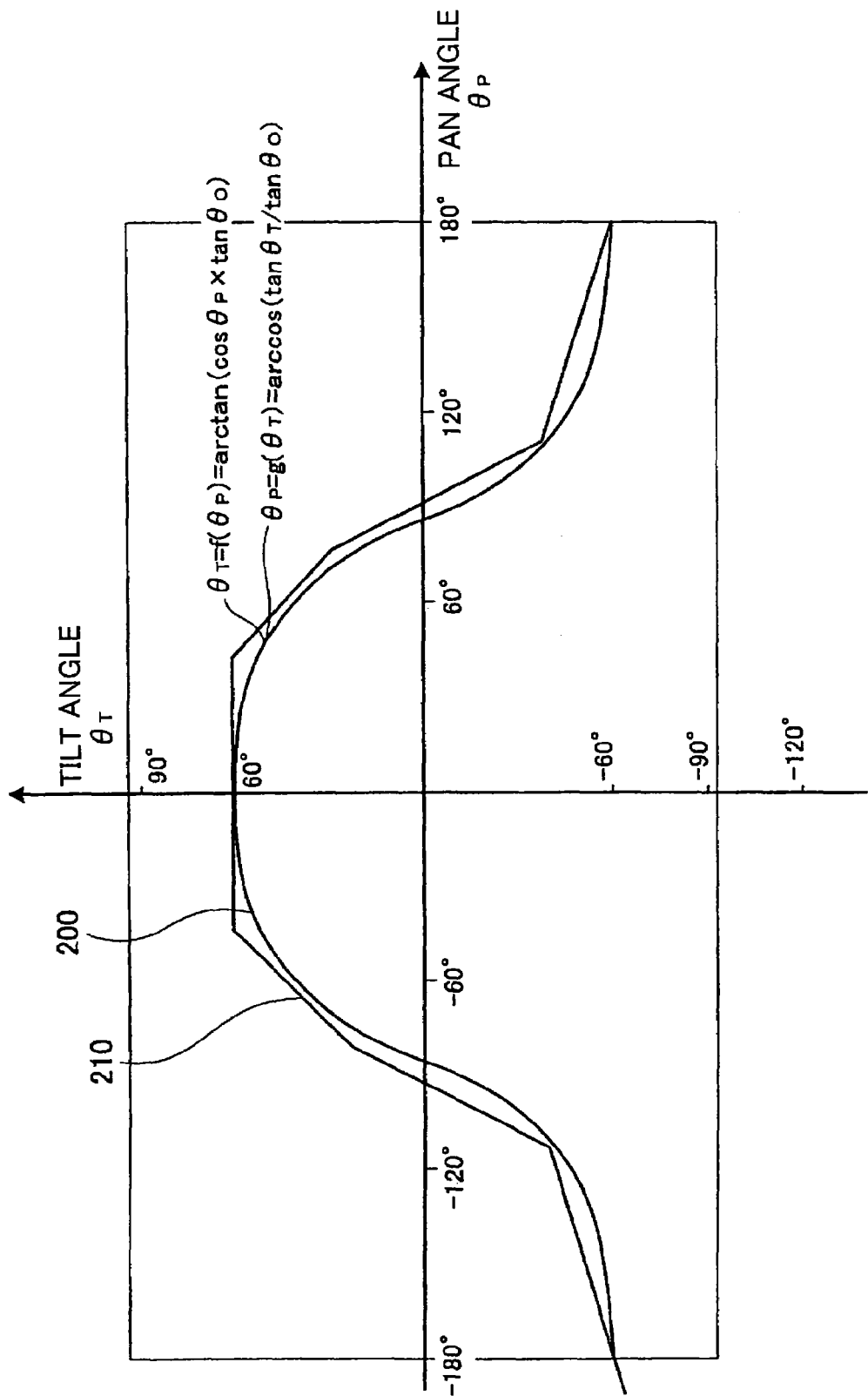
FIG. 9 is a graph showing the upper-limiting pan value stored by the upper-limiting pan value storing means and the upper-limiting tilt value stored by the upper-limiting tilt value storing means each forming part of the preferred embodiment of the surveillance camera apparatus according to the present invention.
Figure 10:
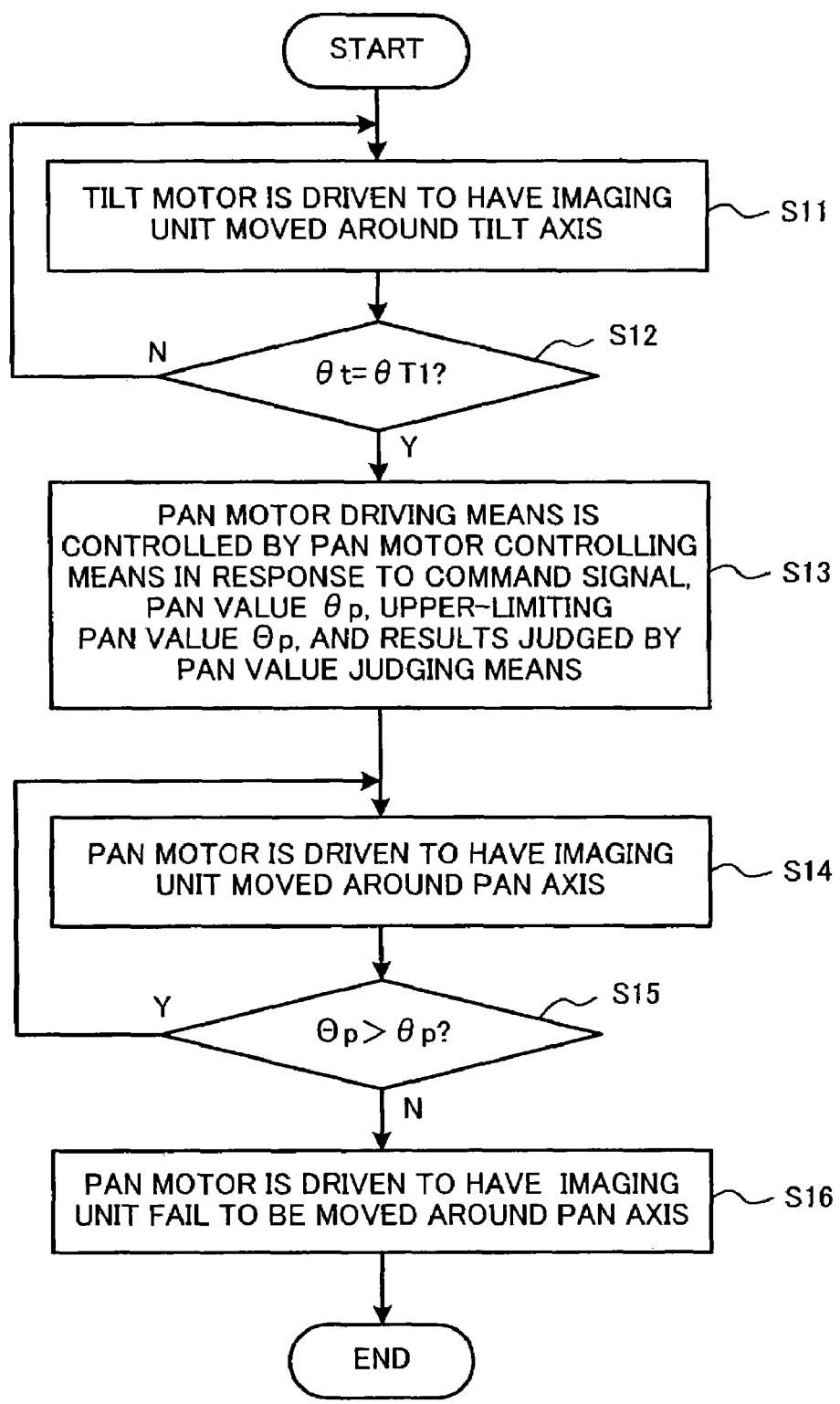
FIG. 10 is a flowchart to be performed according to an aspect of the surveillance camera apparatus according to the present invention.
Figure 11:
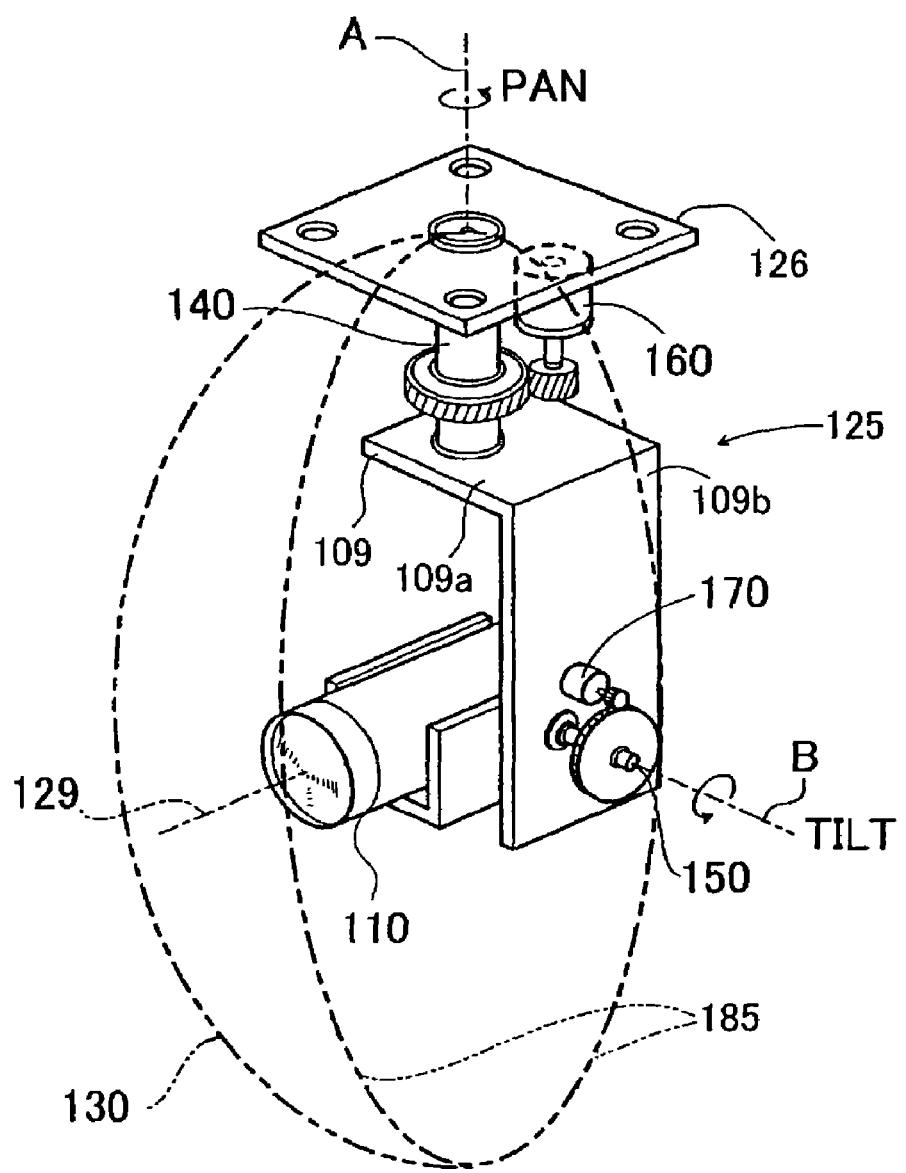
FIG. 11 is a fragmentary perspective view of the conventional surveillance camera apparatus.
Figure 12:
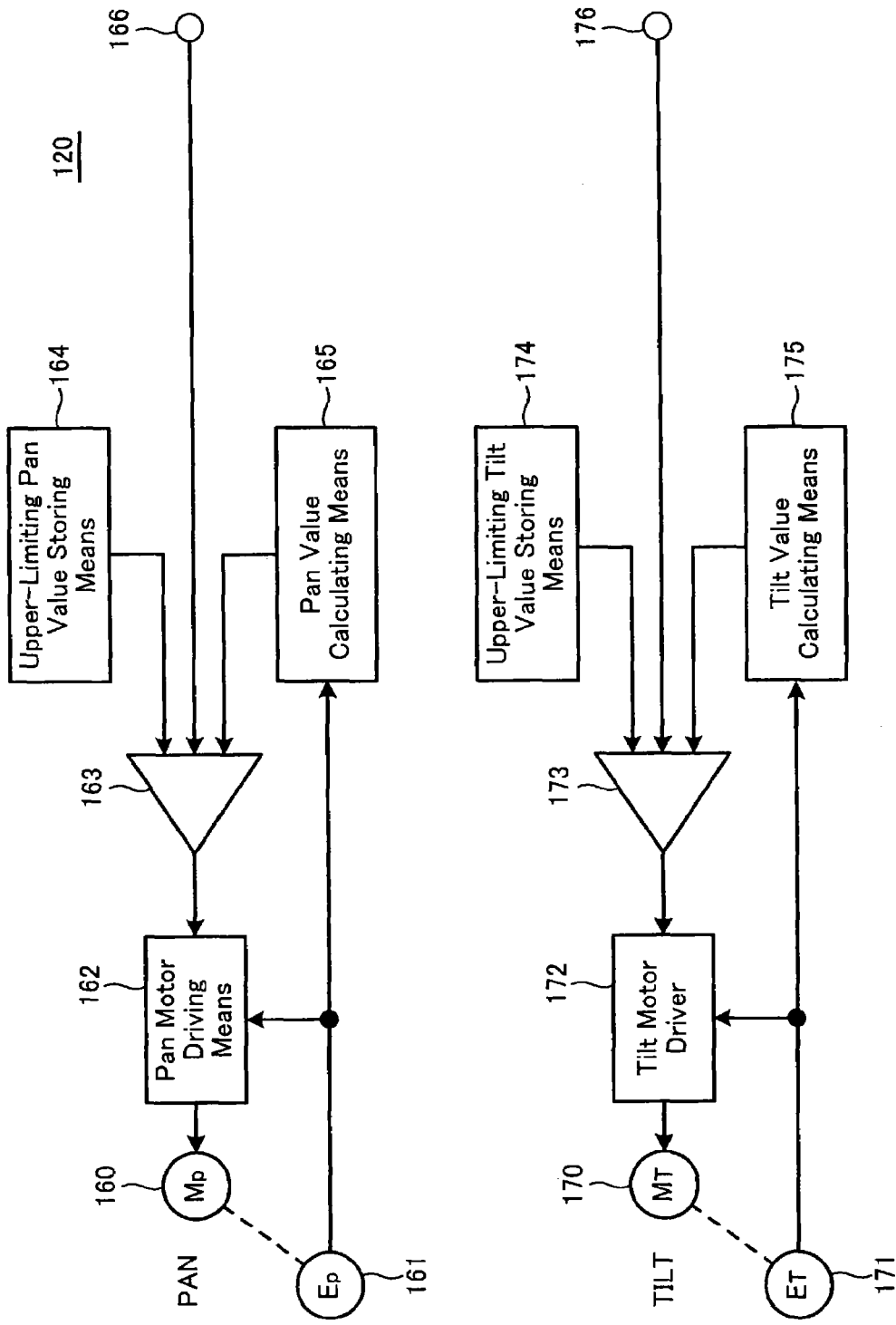
FIG. 12 is a block diagram of the controlling unit forming part of the conventional surveillance camera apparatus.
Figure 13:
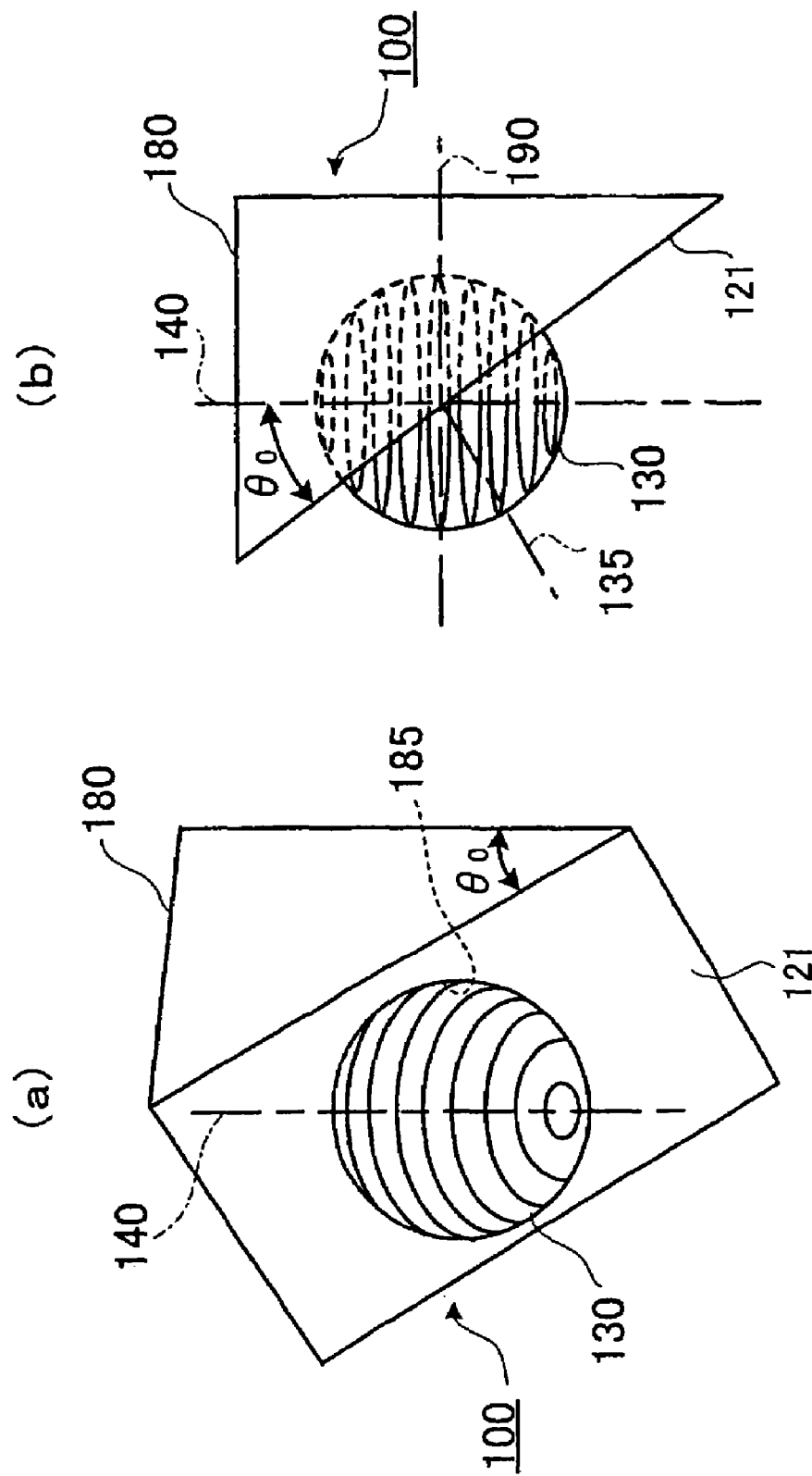
FIG. 13 (a) is a perspective view of a housing assembly forming part of the conventional surveillance camera apparatus.
Figure 14:
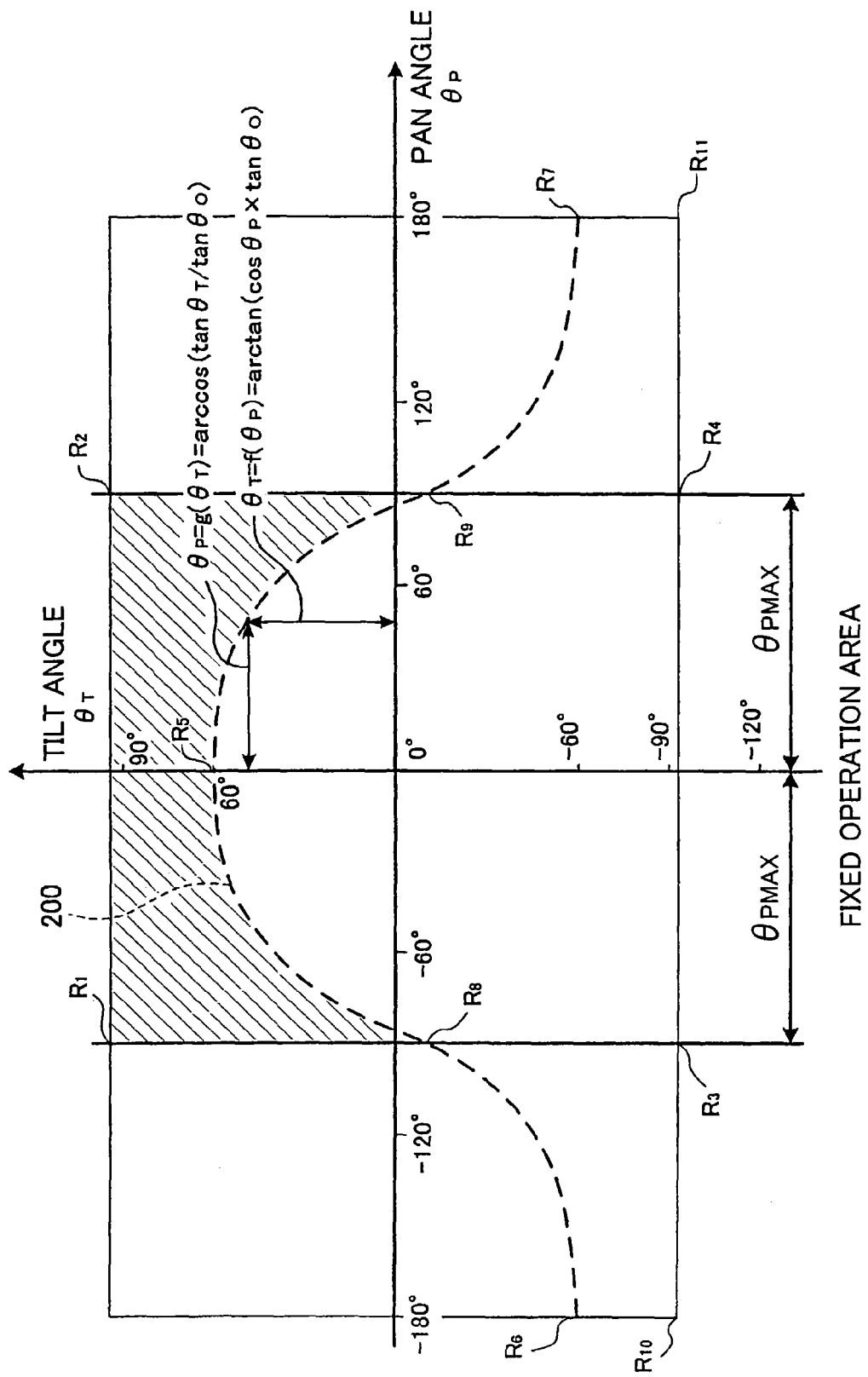
FIG. 14 is a graph showing the predetermined upper-limiting pan value stored by the upper-limiting pan value storing means of the preferred embodiment of the surveillance camera apparatus according to the present invention.
Figure 15:
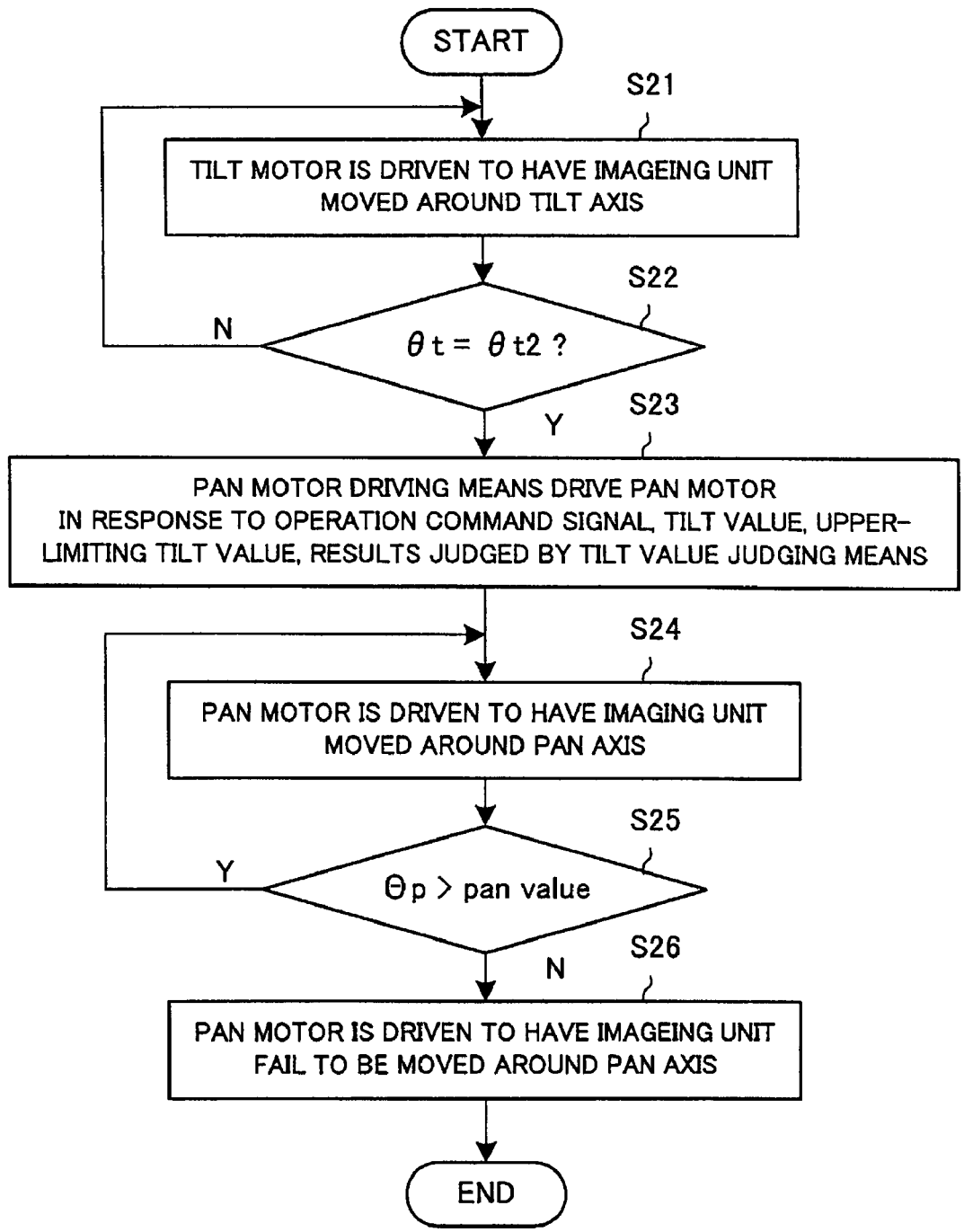
FIG. 15 is a flowchart to be performed according to another aspect of the surveillance camera apparatus according to the present invention.
Figure 16:
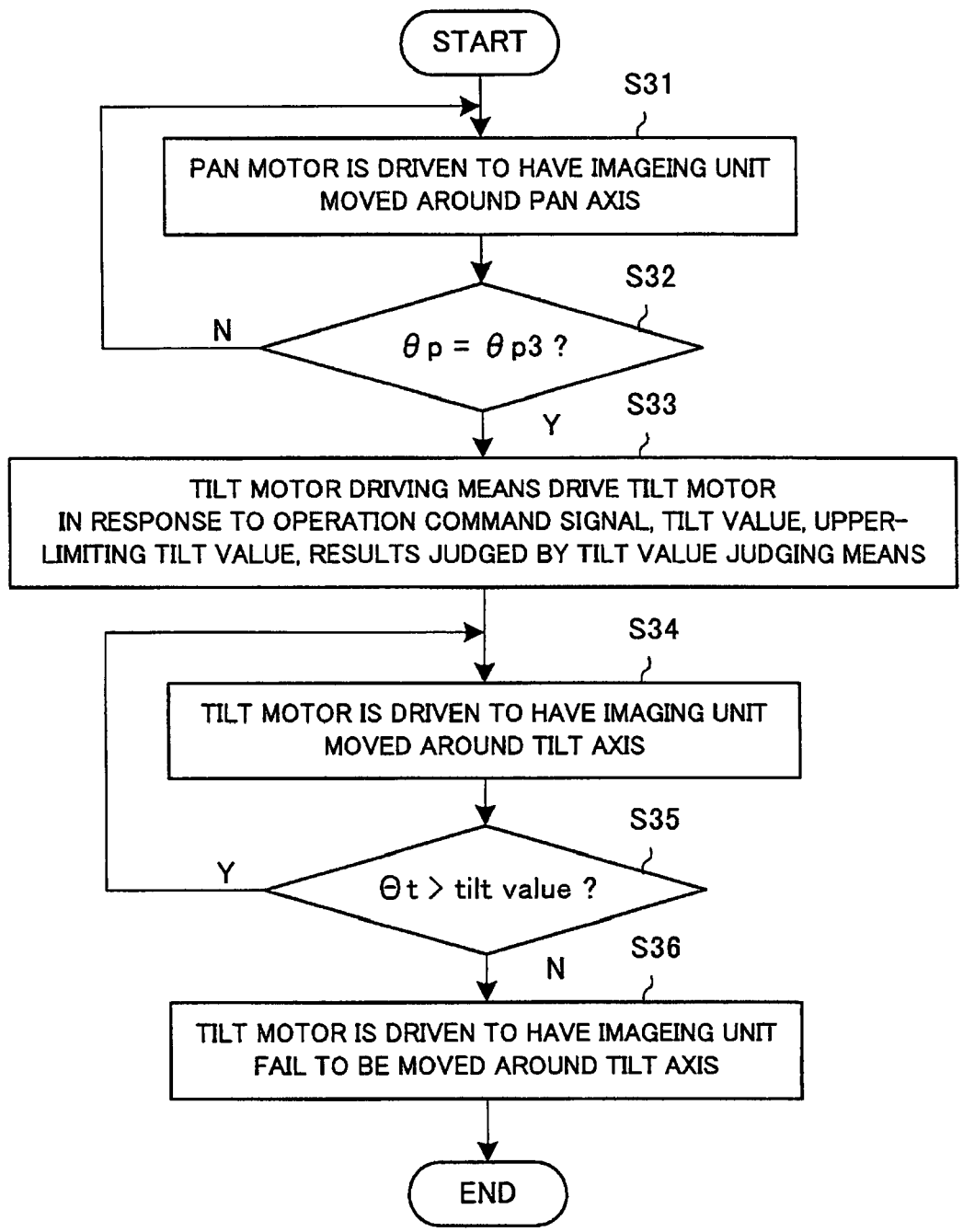
FIG. 16 is a flowchart to be performed according to an additional aspect of the surveillance camera apparatus according to the present invention.
Figure 17:
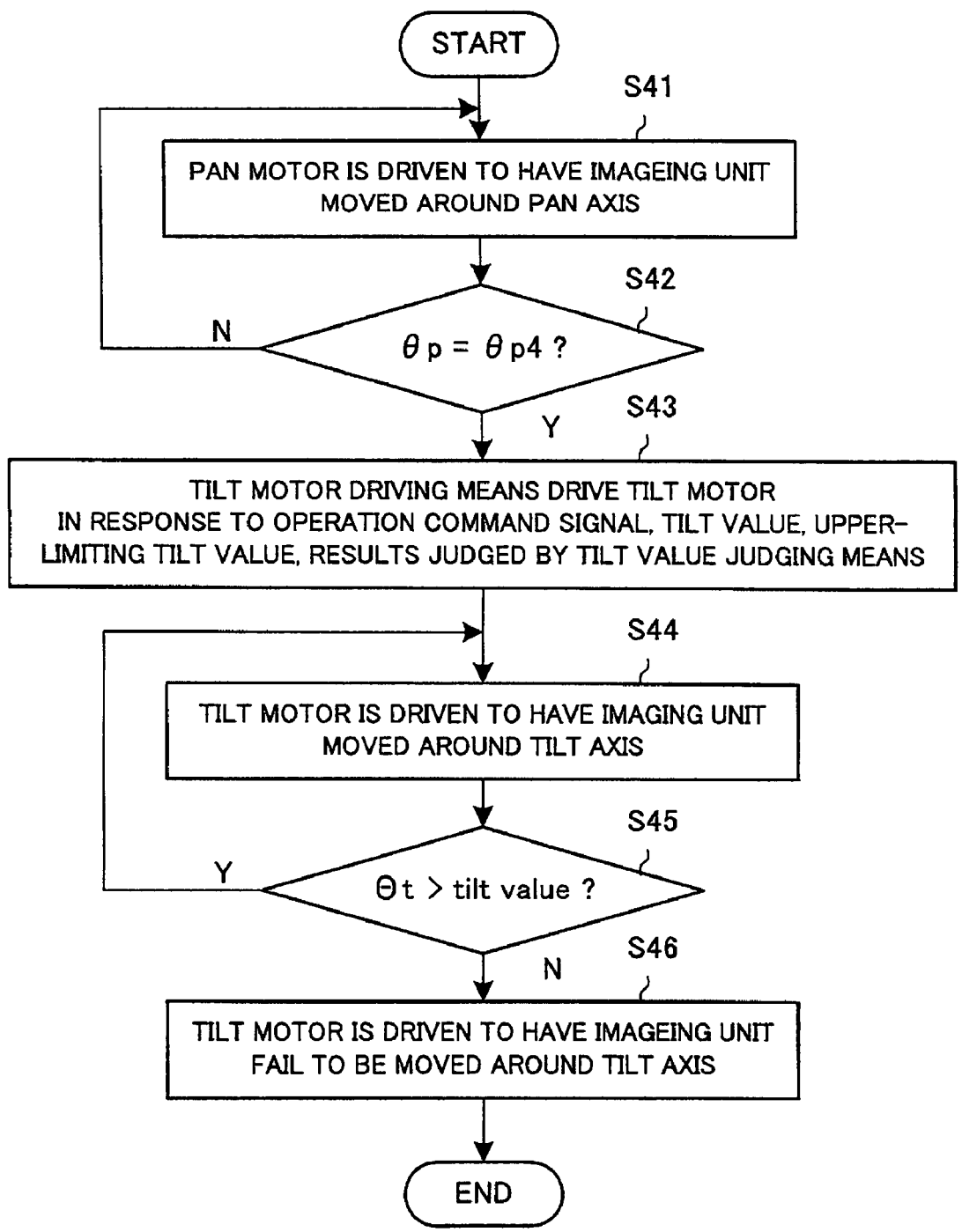
FIG. 17 is a flowchart to be performed according to still another aspect of the surveillance camera apparatus according to the present invention.

The operation of having the camera assembly 25 operated in compliance with the operation command signal inputted into the controlling unit 20 will then be descried in detail hereinafter with reference to FIG. 7.

In order to have the controlling unit 20 adjust the tilt angle "θt" between the first imaginary pas plane "p1" and the second imaginary pan plane "p2" to a pan angle "θP3" in response to the operation command signal to have the imaging unit 18 move around the tilt axis 15 of the tilt shaft 11, and to have the imaging unit 18 move around the tilt axis 15 of the tilt shaft 11, the microcomputer is operated to output the operation command signal to the controlling unit 20.

The operation command signal is firstly received from the microcomputer unit by the controlling unit 20. The pan motor driving means 32 is then controlled by the pan motor controlling means 33 to have the pan motor driving means 32 drive the pan motor 7 in response to the operation command signal received from the microcomputer unit, the pan value calculated by the pan value calculating means 35, and the upper-limiting pan value received from the upper-limiting pan value storing means 34. The pan motor 7 is then driven by the pan motor driving means 32 to have the imaging unit 18 move around the pan axis 10 of the pan shaft 5 in the step S31. The judgment is then made by the pan value judging means 36 on whether or not the pan angle "Θp" between the first imaginary tilt plane "T1" and the second imaginary tilt plane "T2" is equal to the pan angle "θP3" based on the pan value calculated by the pan value calculating means 35 in the step S32.

When the answer in the step S32 is in the affirmative "Yes", i.e., the pan angle "Θp" between the first imaginary tilt plane "T1" and the second imaginary tilt plane "T2" is equal to the tilt angle "θP3", the step S32 proceeds to the step S33. When, on the other hand, the answer in the step S32 is in the negative "No", i.e., the pan angle "Θp" between the first imaginary tilt plane "T1" and the second imaginary tilt plane "T2" is not equal to the tilt angle "θP3", the step S32 proceeds to the step S31.

The tilt motor driving means 42 is then controlled by the tilt motor controlling means 43 to have the tilt motor driving means 42 drive the tilt motor 13 in response to the operation command signal received from the microcomputer unit, the tilt value calculated by the tilt value calculating means 45, the upper-limiting tilt value received from the upper-limiting tilt value storing means 44, and results judged by tilt value judging means 46 in the step S43. The tilt motor 13 is then driven by the tilt motor driving means 42 to have the imaging unit 18 move around the tilt axis 15 of the tilt shaft 11 in the step S 44. The judgment is then made by the tilt value judging means 46 on whether or not the upper-limiting tilt value "Θt" received from the upper-limiting tilt value storing means 44 exceeds the tilt value calculated by the tilt value calculating means 45 based on the pan value calculated by the pan value calculating means 35 in the step S35.

When the answer in the step S35 is in the affirmative "Yes", i.e., the upper-limiting tilt value "Θt" received from the upper-limiting tilt value storing means 44 exceeds the tilt value calculated by the tilt value calculating means 45, the step S35 proceeds to the step S34. When, on the other hand, the answer in the step S35 is in the negative "No", i.e., the upper-limiting tilt value "Θ" received from the upper-limiting tilt value storing means 34 does not exceed the tilt value calculated by the tilt value calculating means 45, the step S35 proceeds to the step S36. The tilt motor 13 is then driven by the tilt motor driving means 42 to have the imaging unit 18 fail to move around the tilt axis 15 of the tilt shaft 11 in the step S36.

From the above detail description, the pan motor can be driven by the pan motor driving means 32 to have the imaging unit 18 move around the pan axis 10 of the pan shaft 5 in consideration with the upper-limiting pan value "Θp" depending on the shape of the opening 3 of the slanted plate portion 2a forming part of the housing assembly 2.

In order to have the imaging unit 18 move around the tilt axis 15 of the tilt shaft 11 in response to the operation command signal to have the controlling unit 20 adjust the pan angle "Θp" between the first imaginary tilt plane "T1" and the second imaginary tilt plane "T2" to a tilt angle "θP4", and to have the imaging unit 18 move around the tilt axis 15 of the tilt shaft 11, the microcomputer is operated to output the operation command signal to the controlling unit 20.

The operation command signal is firstly received from the microcomputer unit by the controlling unit 20. The pan motor driving means 32 is then controlled by the pan motor controlling means 33 to have the pan motor driving means 32 drive the pan motor 7 in response to the operation command signal received from the microcomputer unit through a terminal 21a, the pan value calculated by the pan value calculating means 35, and the upper-limiting pan value received from the upper-limiting pan value storing means 34. The pan motor 7 is then driven by the pan motor driving means 32 to have the imaging unit 18 move around the pan axis 10 of the pan shaft 5 in the step S41. The judgment is then made by the pan value judging means 36 on whether or not the pan angle "Θp" between the first imaginary tilt plane "T1" and the second imaginary tilt plane "T2" is equal to the pan angle "θP4" based on the pan value calculated by the pan value calculating means 35 in the step S42.

When the answer in the step S42 is in the affirmative "Yes", i.e., the pan angle "Θp" between the first imaginary tilt plane "T1" and the second imaginary tilt plane "T2" is equal to the tilt angle "θP4", the step S42 proceeds to the step S43. When, on the other hand, the answer in the step S42 is in the negative "No", i.e., the pan angle "Θp" between the first imaginary tilt plane "T1" and the second imaginary tilt plane "T2" is not equal to the tilt angle "θP4", the step S42 proceeds to the step S41.

The tilt motor driving means 42 is then controlled by the tilt motor controlling means 43 to have the tilt motor driving means 42 drive the tilt motor 13 in response to the operation command signal received from the microcomputer unit through a terminal 21b, the tilt value calculated by the tilt value calculating means 45, the upper-limiting tilt value received from the upper-limiting tilt value storing means 44, and results judged by tilt value judging means 46 in the step S43. The tilt motor 13 is then driven by the tilt motor driving means 42 to have the imaging unit 18 move around the tilt axis 15 of the tilt shaft 11 in the step S 44. The judgment is then made by the tilt value judging means 46 on whether or not the upper-limiting tilt value "Θt" received from the upper-limiting tilt value storing means 44 exceeds the tilt value calculated by the tilt value calculating means 45 based on the pan value calculated by the pan value calculating means 35 in the step S45.

When the answer in the step S45 is in the affirmative "Yes", i.e., the upper-limiting tilt value "Θt" received from the upper-limiting tilt value storing means 44 exceeds the tilt value calculated by the tilt value calculating means 45, the step S45 proceeds to the step S 44. When, on the other hand, the answer in the step S45 is in the negative "No", i.e., the upper-limiting tilt value "Θt" received from the upper-limiting tilt value storing means 34 does not exceed the tilt value calculated by the tilt value calculating means 45, the step S45 proceeds to the step S46. The tilt motor 13 is then driven by the tilt motor driving means 42 to have the imaging unit 18 fail to move around the tilt axis 15 of the tilt shaft 11 in the step S46.

From the above detail description, the pan motor can be driven by the pan motor driving means 32 to have the imaging unit 18 move around the pan axis 10 of the pan shaft 5 in consideration with the upper-limiting pan value "Θp" depending on the shape of the opening 3 of the slanted plate portion 2a forming part of the housing assembly 2.

While there has been described in the forgoing embodiment about the fact that the controlling unit 20 includes upper-limiting pan value storing means 34 for previously storing an upper-limiting pan value in association with the tilt angle between the first imaginary pan plane "p1" and the second imaginary pan plane "p2", and outputting the upper-limiting pan value in response to the tilt value calculated by the tilt value calculating means 45, the upper-limiting pan value storing means 34 may be replaced by upper-limiting pan value calculating means for calculating an upper-limiting pan value in association with the tilt angle between the first imaginary pan plane "p1" and the second imaginary pan plane "p2".

In the above embodiment, the pan value judging means 36 is operative to judge whether or not the upper-limiting pan value received from the upper-limiting pan value storing means 34 exceeds the pan value calculated by the pan value calculating means 35 based on the tilt value calculated by the tilt value calculating means 45, however, the pan value judging means 36 may be operative to judge whether or not the upper-limiting pan value calculated by the upper-limiting pan value calculating means exceeds the pan value calculated by the pan value calculating means 35 based on the tilt value calculated by the tilt value calculating means 45.

Although there have been described in the foregoing embodiments about the facts that the controlling unit 20 includes upper-limiting tilt value storing means 44 for previously storing an upper-limiting tilt value in association with the pan angle "θp" between the first imaginary tilt plane "t1" and the second imaginary tilt plane "t2" therein, and outputting the upper-limiting tilt value in response to the pan value calculated by the pan value calculating means 35, the upper-limiting tilt value storing means 44 may be replaced by upper-limiting tilt value calculating means for calculating an upper-limiting tilt value in association with the pan angle "θp" between the first imaginary tilt plane "t1" and the second imaginary tilt plane "t2".

In the above embodiment, the tilt value judging means 46 is operative to judge whether or not the upper-limiting tilt value received from the upper-limiting tilt value storing means 44 exceeds the tilt value calculated by the tilt value calculating means 45 based on the pan value calculated by the pan value calculating means 35, however, the tilt value judging means 46 may be operative to judge whether or not the upper-limiting tilt value calculated by the upper-limiting pan value calculating means exceeds the tilt value calculated by the tilt value calculating means 45 based on the pan value calculated by the pan value calculating means 35.

In the above embodiment, the upper-limiting pan value storing means 34 is operative to previously store the upper-limiting pan value "Θp" given by the following equation (1), however, the upper-limiting pan value storing means 34 may be operative to previously store the upper-limiting pan value "Θp" obtained by approximately calculating along the following equation (1).

In the above embodiment, the upper-limiting tilt value storing means 44 is operative to previously store the upper-limiting tilt value "Θt" given by the following equation (2), however, the upper-limiting tilt value storing means 44 may be operative to previously store the upper-limiting tilt value "Θt" obtained by approximately calculating along the following equation (2).

While there has been described in the forgoing embodiment about the fact that the upper-limiting pan value storing means 34 is operative to previously store the upper-limiting pan value "Θp" given by the following equation (1), the upper-limiting pan value calculating means may be operative to calculate the upper-limiting pan value "Θp" given by the following equation (1).

While there has been described in the forgoing embodiment about the fact that the upper-limiting pan value storing means 34 is operative to previously store the upper-limiting pan value "Θp" obtained by approximately calculating along the following equation (1), the upper-limiting pan value calculating means may be operative to approximately calculating the upper-limiting pan value "Θp" along the following equation (1).

While there has been described in the forgoing embodiment about the fact that the upper-limiting tilt value storing means 44 is operative to previously store the upper-limiting tilt value "Θt" given by the following equation (2), the upper-limiting tilt value calculating means 44 may be operative to calculating the upper-limiting tilt value "Θt" given by the following equation (2).

While there has been described in the forgoing embodiment about the fact that the upper-limiting tilt value storing means 44 is operative to previously store the upper-limiting tilt value "Θt" obtained by approximately calculating along the following equation (2), the upper-limiting tilt value calculating means 44 may be operative to approximately calculating the upper-limiting tilt value "Θt" along the following equation (2).

As will be seen from the above description, the surveillance camera apparatus according to the present invention can control each of the pan motor and the tilt motor to have imaging unit move around each of the pan axis of the pan shaft and tilt axis of the tilt shaft with taking account of the slanted angle and the shape of the opening of the slanted plate portion of the housing assembly. Furthermore, the surveillance camera apparatus according to the present invention can be inexpensive in production cost, and simple in construction and downsized.

While the subject invention has been described with relation to the embodiments, various modifications and adaptations thereof will now be apparent to those skilled in the art as far as such modifications and adaptations fall within the scope of the appended claims intended to be covered thereby.

What is claimed is:

1. A surveillance camera apparatus, comprising: a housing assembly having a slanted plate portion with an inner surface; and a camera assembly accommodated in said housing assembly, said slanted plate portion defining an opening therein, said opening having a central axis thereof, said opening having an imaginary inner surface flush with said inner surface of said slanted plate portion, and said imaginary inner surface of said opening having the shape of a circle, said camera assembly, including:

a stationary member;

a pan shaft having a pan axis thereof, said pan shaft being supported by said stationary member to be revolvable around said pan axis, said slanted plate opening inner surface having a slanted angle with respect to said pan axis;

a retaining member integrally formed with said pan shaft;

a tilt shaft having a tilt axis thereof, said tilt shaft being retained by said retaining member to be revolvable around said tilt axis under the state that said tilt axis of said tilt shaft is in perpendicular relationship with said pan axis of said pan shaft;

an imaging unit for taking an image of a specific object through said opening of said slanted plate portion, said imaging unit having a light axis thereof, said imaging unit being integrally supported by said tilt shaft under the state that said light axis of said imaging unit is in perpendicular relationship with said tilt axis of said tilt shaft;

a pan motor for having said pan shaft driven around said pan axis;

a controlling unit for changing an upper-limiting pan value in response to said slanted angle of said opening and a direction of said imaging unit while controlling said pan motor to allow said imaging unit to be pivotally moved around said pan axis of said pan shaft within said changed upper-limiting pan value.

2. A surveillance camera apparatus as set forth in claim 1, which further comprises a tilt motor for having said tilt shaft driven around said tilt axis, and in which said controlling unit is operative to change an upper-limiting tilt value in response to said slanted angle of said opening and said direction of said imaging unit while controlling said tilt motor to allow said imaging unit to be pivotally moved around said tilt axis of said tilt shaft within said changed upper-limiting tilt value.

3. A surveillance camera apparatus as set forth in claim 2, in which said light axis of said imaging unit is in coplanar relationship with said pan axis of said pan shaft on a first imaginary tilt plane, said light axis of said imaging unit being in coplanar relationship with said tilt axis of said tilt shaft on a first imaginary pan plane, said first imaginary tilt plane intersecting a second imaginary tilt plane having said central axis of said opening placed thereon at a pan angle between said first imaginary tilt plane and said second imaginary tilt plane, said first imaginary pan plane intersecting a second imaginary pan plane having said central axis of said opening placed thereon at a tilt angle between said first imaginary pan plane and said second imaginary pan plane, and in which said controlling unit includes: pan signal producing means for producing a pan signal in association with said revolution of said pan shaft; pan value calculating means for calculating a pan value indicative of said pan angle between said first imaginary tilt plane and said second imaginary tilt plane in response to said pan signal produced by said pan signal producing means; tilt signal producing means for producing a tilt signal in association with said revolution of said tilt shaft; tilt value calculating means for calculating a tilt value indicative of said tilt angle between said first imaginary pan plane and said second imaginary pan plane in response to said tilt signal produced by said tilt signal producing means;

upper-limiting pan value storing means for previously storing an upper-limiting pan value in association with said tilt angle between said first imaginary pan plane and said second imaginary pan plane, and outputting said upper-limiting pan value in response to said tilt value calculated by said tilt value calculating means; pan value judging means for judging whether or not said upper-limiting pan value received from said upper-limiting pan value storing means exceeds said pan value calculated by said pan value calculating means based on said tilt value calculated by said tilt value calculating means; pan motor driving means for driving said pan motor to have said pan shaft move around said pan axis of said pan shaft; pan motor controlling means for controlling said pan motor driving means to have said pan motor driving means drive said pan motor based on results judged by said pan value judging means; upper-limiting tilt value storing means for previously storing an upper-limiting tilt value in association with said pan angle between said first imaginary tilt plane and said second imaginary tilt plane, and outputting said upper-limiting tilt value in response to said pan value calculated by said pan value calculating means; tilt value judging means for judging whether or not said upper-limiting tilt value received from said upper-limiting pan value storing means exceeds said tilt value calculated by said tilt value calculating means based on said pan value calculated by said pan value calculating means; tilt motor driving means for driving said tilt motor to have said tilt shaft move around said tilt axis of said tilt shaft; and tilt motor controlling means for controlling said tilt motor driving means to have said tilt motor driving means drive said tilt motor based on results judged by said tilt value judging means.

4. A surveillance camera apparatus as set forth in claim 1, in which said retaining member is in the form of L-shape in cross-section, and has a first plate portion having a surface paralleled to that of the stationary member and a second plate portion having a surface to be perpendicular to that of said first plate portion with integrally formed with said first plate portion.

5. A surveillance camera apparatus as set forth in claim 4, in which said housing assembly further includes two different portions consisting of vertical and horizontal plate portions each having an inner surface, said vertical plate portion being integrally formed with said slanted plate portion under the state that said inner surface of said vertical plate portion being in face-to-face relationship with said inner surface of said slanted plate portion at a slanted angle between said inner surface of said vertical plate portion and said inner surface of said slanted plate portion, and said vertical plate portion being integrally formed with said horizontal plate portion under the state that said inner surface of said vertical plate portion being in face-to-face relationship with said inner surface of said horizontal plate portion at a right angle between said inner surface of said vertical plate portion and said inner surface of said horizontal plate portion.

6. A surveillance camera apparatus as set forth in claim 1, in which said housing assembly further includes a hollow hemispherical portion having a central axis, said hollow hemispherical portion being integrally formed with said slanted plate portion under the state that said central axis of said hollow hemispherical portion and said central axis of said opening of said slanted plate portion are axially aligned with each other.

7. A surveillance camera apparatus as set forth in claim 1, in which said stationary member forming part of said camera assembly is securely formed with said horizontal plate portion forming part of said housing assembly under the state that said pan axis of said pan shaft is in coplanar relationship with said central axis of said opening of said slanted plate portion.

8. A surveillance camera apparatus as set forth in claim 7, in which said pan axis of said pan shaft and said central axis of said opening of said slanted plate portion forming part of said housing assembly intersect with each other at said central point of said imaginary inner surface of said opening of said slanted plate portion forming part of said housing assembly.

9. A surveillance camera apparatus as set forth in claim 3, in which said pan motor driving means is operative to assume three different operation states consisting of a first operation state to drive said pan motor to have said imaging unit move clockwise around said pan axis of said pan shaft, a second operation state to drive said pan motor to have said imaging unit move counterclockwise around said pan axis of said pan shaft, and a third operation state to drive said pan motor to have said imaging unit fail to move around said pan axis of said pan shaft.

10. A surveillance camera apparatus as set forth in claim 3, in which said tilt motor driving means is operative to assume three different operation states consisting of a first operation state to drive said tilt motor to have said imaging unit move clockwise around said tilt axis of said tilt shaft, a second operation state to drive said tilt motor to have said imaging unit move counterclockwise around said tilt axis of said tilt shaft, and a third operation state to drive said tilt motor to have said imaging unit fail to move around said tilt axis of said tilt shaft.

11. A surveillance camera apparatus as set forth in claim 9, in which said pan motor controlling means is operative to control said pan motor driving means to have said pan motor driving means assume said third operation state when the judgment is made by said pan value judging means as said pan value calculated by said pan value calculating means being equal to said upper-limiting pan value stored by said upper-limiting pan value storing means.

12. A surveillance camera apparatus as set forth in claim 10, in which said tilt motor controlling means is operative to control said tilt motor driving means to have said tilt motor driving means assume said third operation state when the judgment is made by said tilt value judging means as said tilt value calculated by said tilt value calculating means being equal to said upper-limiting tilt value stored by said upper-limiting tilt value storing means.

13. A surveillance camera apparatus as set forth in claim 9, in which said controlling unit is operably connected to a microcomputer for producing an operation command signal to have said imaging unit automatically move around the pan axis of said pan shaft, and in which said pan motor controlling means is operative to control said pan motor driving means to switch said operation state to be assumed by said pan motor driving means from one of said first operation state and said second operation state to the other of said first operation state and said second operation state when the judgment is made by said pan value judging means as said pan value calculated by said pan value calculating means being equal to said upper-limiting pan value stored by said upper-limiting pan value storing means.

14. A surveillance camera apparatus as set forth in claim 10, in which said controlling unit 20 is operably connected to a microcomputer for producing an operation command signal to have said imaging unit automatically move around said tilt axis of said tilt shaft, and in which said tilt motor controlling means is operative to control said tilt motor driving means to switch said operation state to be assumed by said tilt motor driving means from one of said first operation state and said second operation state to the other of said first operation state and said second operation state when the judgment is made by said tilt value judging means as said tilt value calculated by said tilt value calculating means being equal to said upper-limiting tilt value stored by said upper-limiting tilt value storing means.

15. A surveillance camera apparatus as set forth in claim 11, in which said upper-limiting pan value storing means is operative to previously further store a mechanically-limited pan value in association with said tilt angle between said first imaginary pan plane and said second imaginary pan plane, said mechanically-limited pan value being larger than said upper-limiting pan value, and in which said pan motor controlling means is operative to control said pan motor driving means to have said pan motor driving means drive said pan motor, and to have said imaging unit move to said mechanically-limited pan value received from said upper-limiting pan value storing means after having said pan motor driving means assume said third operation state.

16. A surveillance camera apparatus as set forth in claim 12, in which said upper-limiting tilt value storing means is operative to previously further store a mechanically-limited tilt value in association with said pan angle between said first imaginary tilt plane and said second imaginary tilt plane, said mechanically-limited tilt value being larger than said upper-limiting tilt angle, and in which said tilt motor controlling means is operative to control said tilt motor driving means to have said tilt motor driving means drive said tilt motor, and to have said imaging unit move to said mechanically-limited tilt value received from said upper-limiting tilt value storing means after having tilt motor driving means assume said third operation state.

17. A surveillance camera apparatus as set forth in claim 3, in which said upper-limiting pan value storing means is operative to previously store said upper-limiting pan value "Θp" given by a following equation:

Θ$p$=±arccosine(tan θ$t$/tan θ$o$)

wherein "θt" is indicative of said tilt angle between said first imaginary pan plane and said second imaginary pan plane, and "θo" is indicative of said first slanted angle between said inner surface of said vertical plate portion and said inner surface of said slanted plate portion.

18. A surveillance camera apparatus as set forth in claim 3, in which said upper-limiting pan value storing means is operative to previously store said upper-limiting pan value "Θp" obtained by approximately calculating along a following equation:

Θ$p$=±arccosine(tan θ$t$/tan θ$o$)

wherein "θt" is indicative of said tilt angle between said first imaginary pan plane and said second imaginary pan plane, and "θo" is indicative of said first slanted angle between said inner surface of said vertical plate portion and said inner surface of said slanted plate portion.

19. A surveillance camera apparatus as set forth in claim 3, in which said upper-limiting tilt value storing means is operative to previously store said upper-limiting tilt value "Θt" given by a following equation:

Θ$t$=arctan(cos θ$p$×tan θ$o$)

wherein "θp" is indicative of said pan angle between said first imaginary tilt plane and said second imaginary tilt plane, and "θo" is indicative of said first slanted angle between said inner surface of said vertical plate portion and said inner surface of said slanted plate portion.

20. A surveillance camera apparatus as set forth in claim 3, in which said upper-limiting tilt value storing means is operative to previously store said upper-limiting tilt value "Θt" obtained by approximately calculating along a following equation:

Θ$t$=arctan(cos θ$p$×tan θ$o$)

wherein "θp" is indicative of said pan angle between said first imaginary tilt plane and said second imaginary tilt plane, and "θo" is indicative of said first slanted angle between said inner surface of said vertical plate portion and said inner surface of said slanted plate portion.

21. A surveillance camera apparatus as set forth in claim 13, in which said pan motor controlling means is operative to produce a pan response signal indicative of said results judged by said pan value judging means, and output said response signal to said microcomputer.

22. A surveillance camera apparatus as set forth in claim 14, in which said tilt motor controlling means is operative to produce a tilt response signal indicative of said results judged by said tilt value judging means, and output said tilt response signal to said microcomputer.

23. A surveillance camera apparatus as set forth in claim 2, in which said light axis of said imaging unit is in coplanar relationship with said pan axis of said pan shaft on a first imaginary tilt plane, said light axis of said imaging unit being in coplanar relationship with said tilt axis of said tilt shaft on a first imaginary pan plane, said first imaginary tilt plane intersecting a second imaginary tilt plane having said central axis of said opening placed thereon at a pan angle between said first imaginary tilt plane and said second imaginary tilt plane, said first imaginary pan plane intersecting a second imaginary pan plane having said central axis of said opening placed thereon at a tilt angle between said first imaginary pan plane and said second imaginary pan plane, and in which said controlling unit includes: pan signal producing means for producing a pan signal in association with said revolution of said pan shaft; pan value calculating means for calculating a pan value indicative of said pan angle between said first imaginary tilt plane and said second imaginary tilt plane in response to said pan signal produced by said pan signal producing means; tilt signal producing means for producing a tilt signal in association with said revolution of said tilt shaft; tilt value calculating means for calculating a tilt value indicative of said tilt angle between said first imaginary pan plane and said second imaginary pan plane in response to said tilt signal produced by said tilt signal producing means; upper-limiting pan value calculating means for calculating an upper-limiting pan value in association with said tilt angle between said first imaginary pan plane and said second imaginary pan plane; pan value judging means for judging whether or not said upper-limiting pan value calculated by said upper-limiting pan value calculating means exceeds said pan value calculated by said pan value calculating means based on said tilt value calculated by said tilt value calculating means; pan motor driving means for driving said pan motor to have said pan shaft move around said pan axis of said pan shaft; pan motor controlling means for controlling said pan motor driving means to have said pan motor driving means drive said pan motor based on results judged by said pan value judging means; upper-limiting tilt value calculating means for calculating an upper-limiting tilt value in association with said pan angle between said first imaginary tilt plane and said second imaginary tilt plane; tilt value judging means for judging whether or not said upper-limiting tilt value calculated by said upper-limiting pan value calculating means exceeds said tilt value calculated by said tilt value calculating means based on said pan value calculated by said pan value calculating means; tilt motor driving means for driving said tilt motor to have said tilt shaft move around said tilt axis of said tilt shaft; and tilt motor controlling means for controlling said tilt motor driving means to have said tilt motor driving means drive said tilt motor based on results judged by said tilt value judging means.

24. A surveillance camera apparatus as set forth in claim 23, in which said upper-limiting pan value calculating means is operative to calculate said upper-limiting pan value "Θp" given by a following equation:

$$\Theta p = \pm \arccos(\tan \theta t / \tan \theta o)$$

wherein "θt" is indicative of said tilt angle between said first imaginary pan plane and said second imaginary pan plane, and "θo" is indicative of said first slanted angle between said inner surface of said vertical plate portion and said inner surface of said slanted plate portion.

25. A surveillance camera apparatus as set forth in claim 23, in which said upper-limiting pan value calculating means is operative to approximately calculate said upper-limiting pan value "Θp" along a following equation:

$$\Theta p = \pm \arccos(\tan \theta t / \tan \theta o)$$

wherein "θt" is indicative of said tilt angle between said first imaginary pan plane and said second imaginary pan plane, and "θo" is indicative of said first slanted angle between said inner surface of said vertical plate portion and said inner surface of said slanted plate portion.

26. A surveillance camera apparatus as set forth in claim 23, in which said upper-limiting tilt value calculating means is operative to calculate said upper-limiting tilt value "Θt" given by a following equation:

$$\Theta t = \arctan(\cos \theta p \times \tan \theta o)$$

wherein "θp" is indicative of said pan angle between said first imaginary tilt plane and said second imaginary tilt plane, and "θo" is indicative of said first slanted angle between said inner surface of said vertical plate portion and said inner surface of said slanted plate portion.

27. A surveillance camera apparatus as set forth in claim 23, in which said upper-limiting tilt value calculating means is operative to approximately calculate said upper-limiting tilt value "Θt" along a following equation:

$$\Theta t = \arctan(\cos \theta p \times \tan \theta o)$$

wherein "θp" is indicative of said pan angle between said first imaginary tilt plane and said second imaginary tilt plane, and "θo" is indicative of said first slanted angle between said inner surface of said vertical plate portion and said inner surface of said slanted plate portion.

* * * * *

UNITED STATES PATENT AND TRADEMARK OFFICE
CERTIFICATE OF CORRECTION

| | | |
|---|---|---|
| PATENT NO. | : 7,616,229 B2 | Page 1 of 1 |
| APPLICATION NO. | : 10/615691 | |
| DATED | : November 10, 2009 | |
| INVENTOR(S) | : Jouji Wada et al. | |

It is certified that error appears in the above-identified patent and that said Letters Patent is hereby corrected as shown below:

In the specification, column 13, line 42, please insert a --p-- as a subscript after "⊖" and inside the quotes, In the specification, column 16, line 16, please replace the word "descried" with the word --described--, In the specification, column 17, line 7, please insert a --t-- as a subscript after "⊖" and inside the quotes.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,616,229 B2 | Page 1 of 1 |
| APPLICATION NO. | : 10/615691 | |
| DATED | : November 10, 2009 | |
| INVENTOR(S) | : Wada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Nineteenth Day of October, 2010

David J. Kappos
*Director of the United States Patent and Trademark Office*